Figure 1:
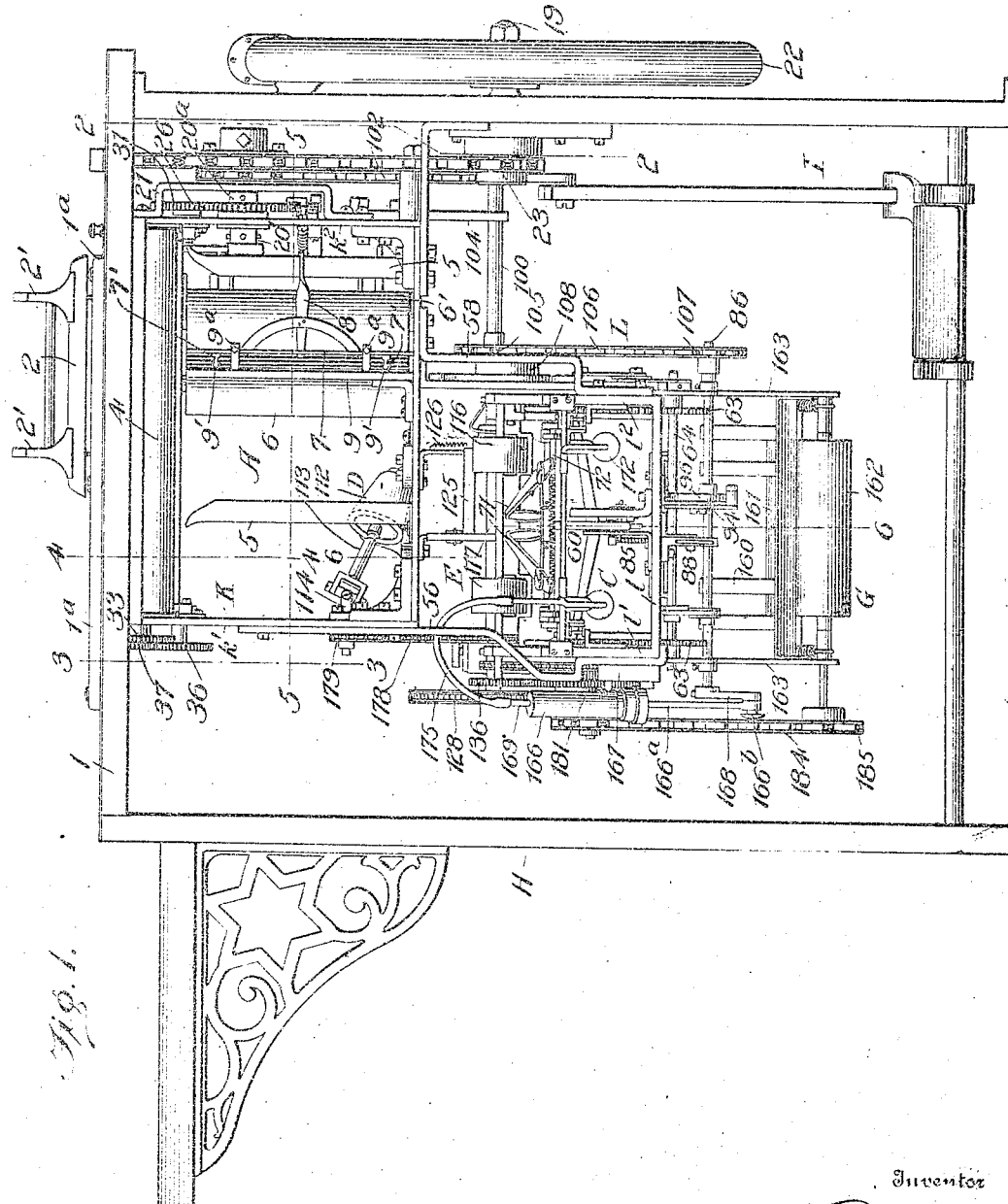

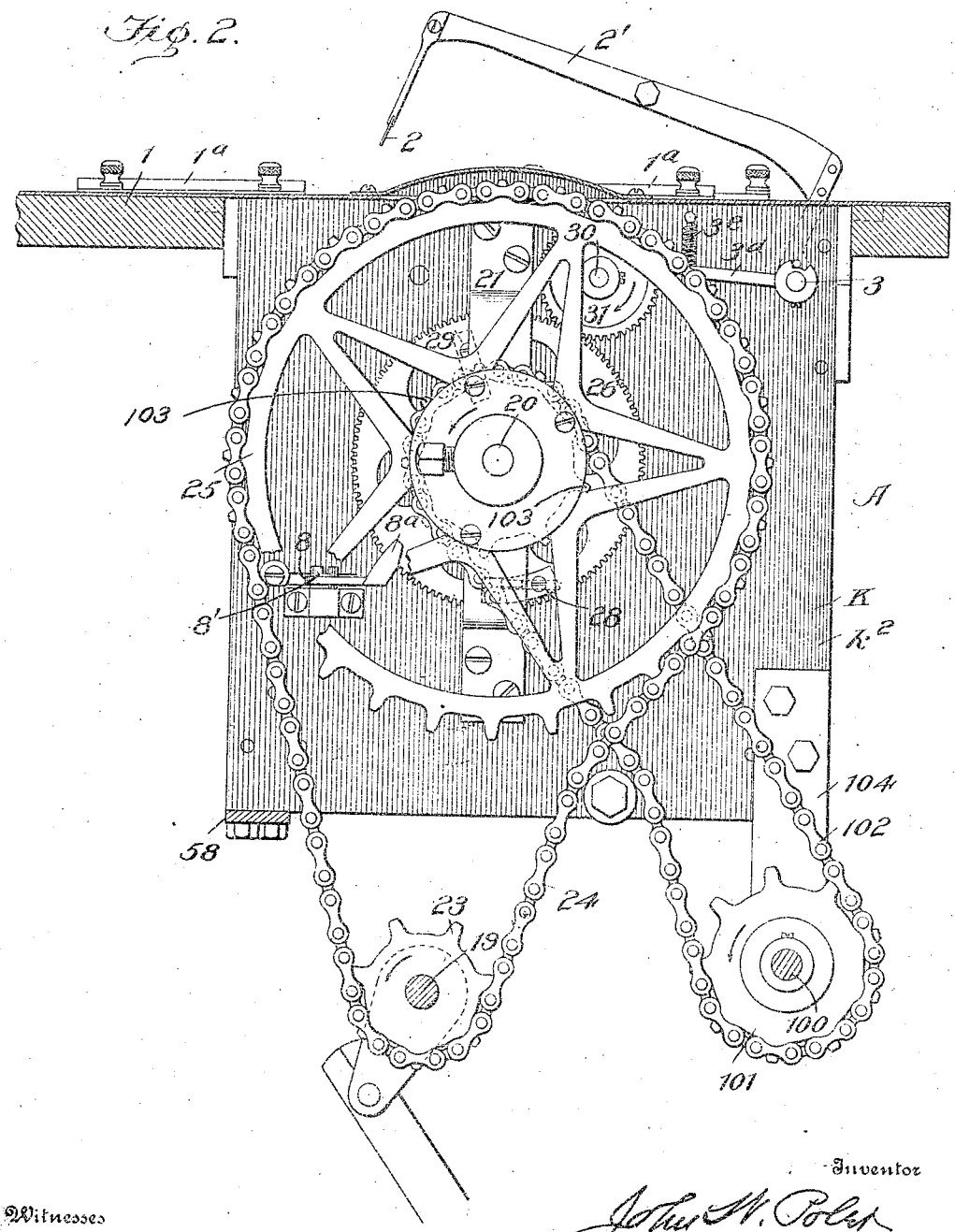

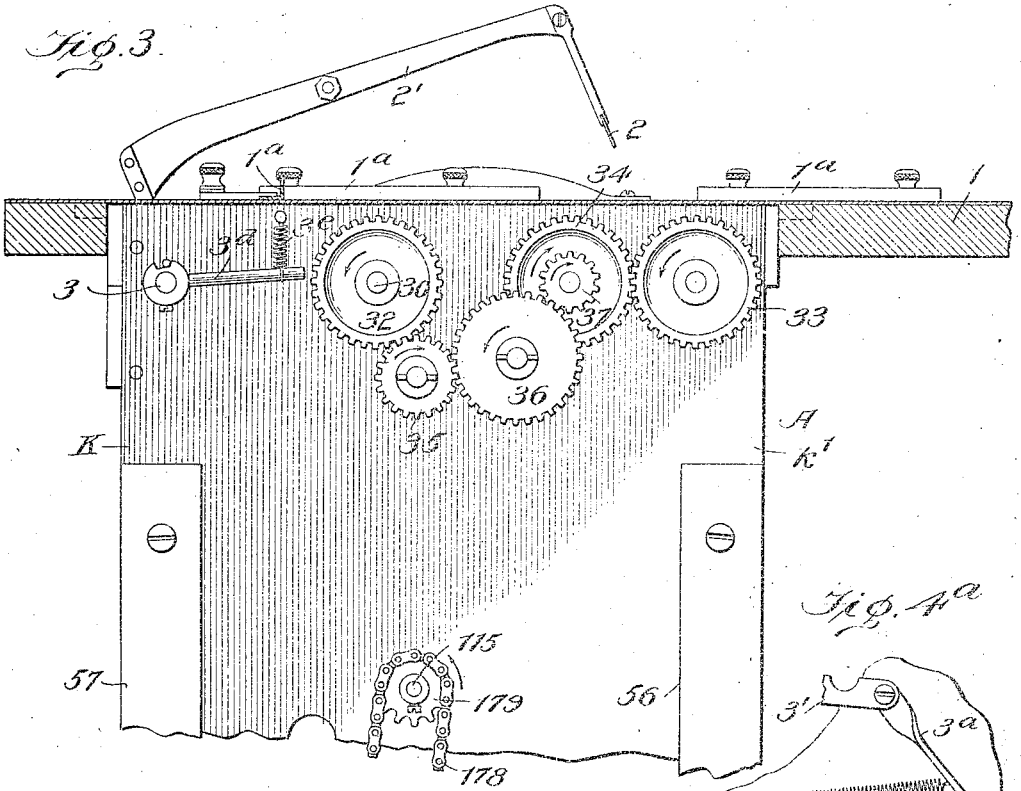
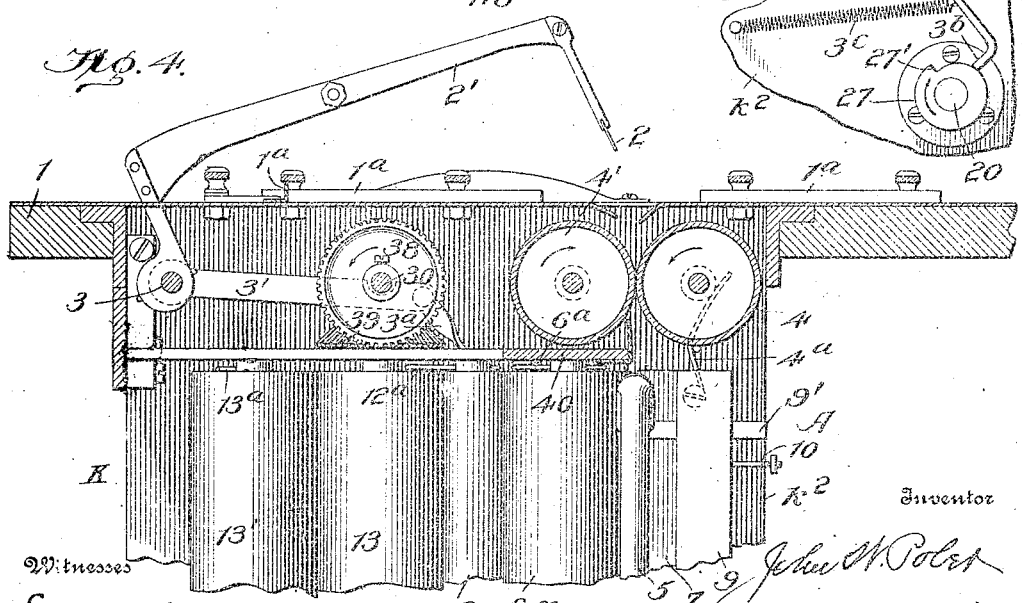

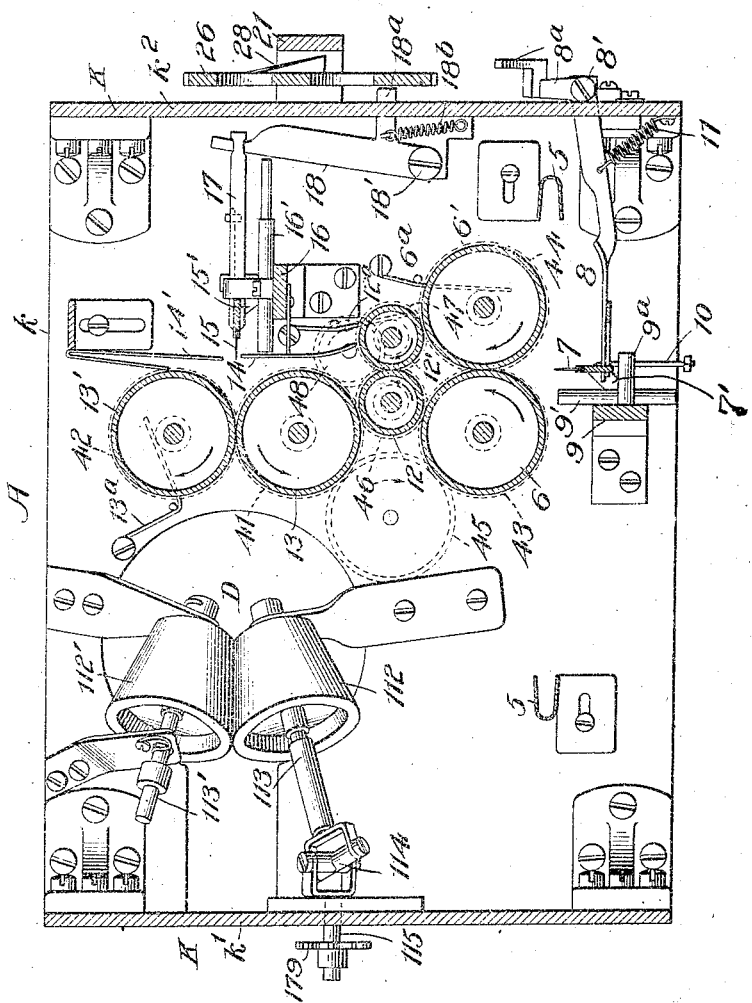

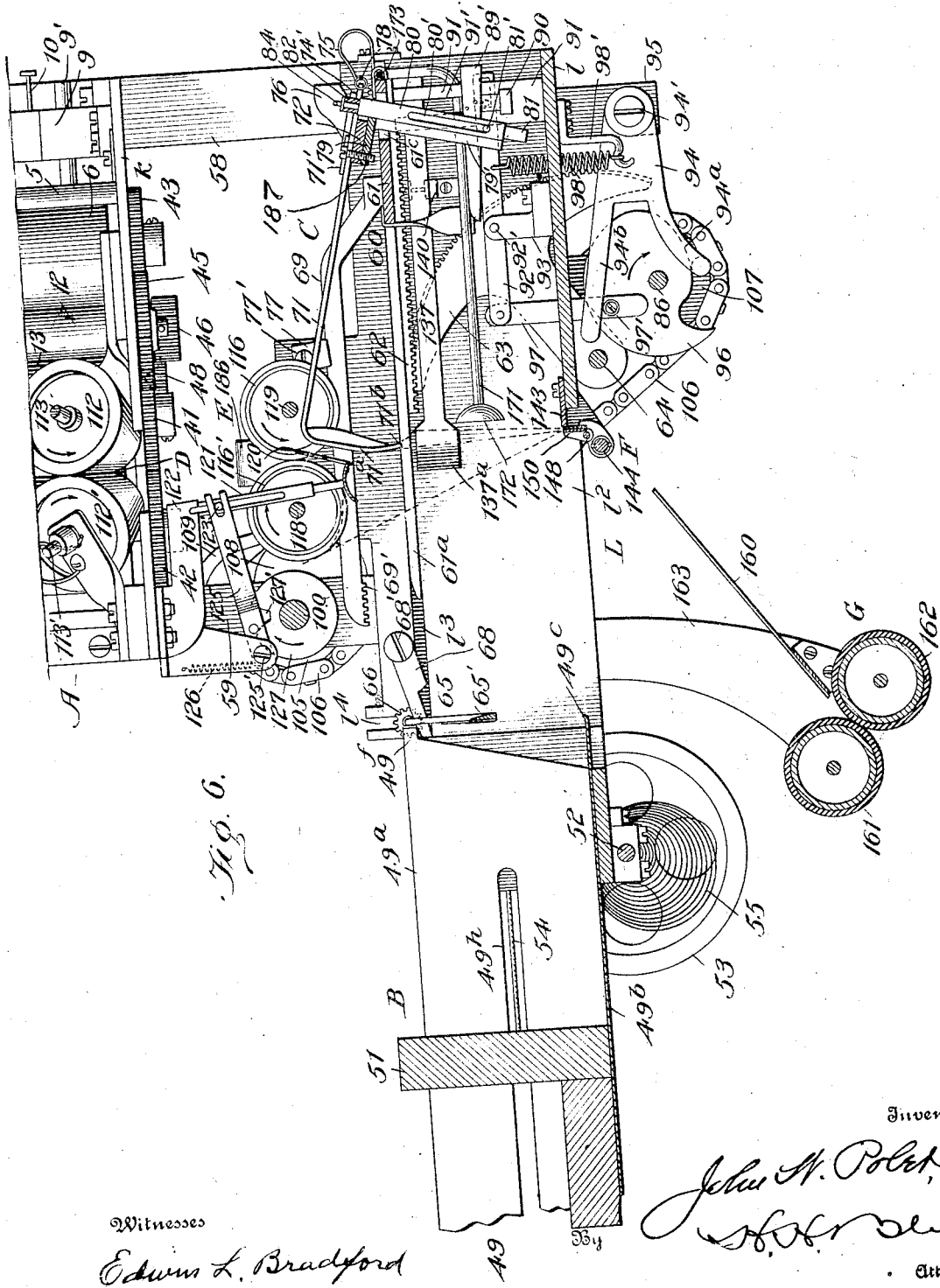

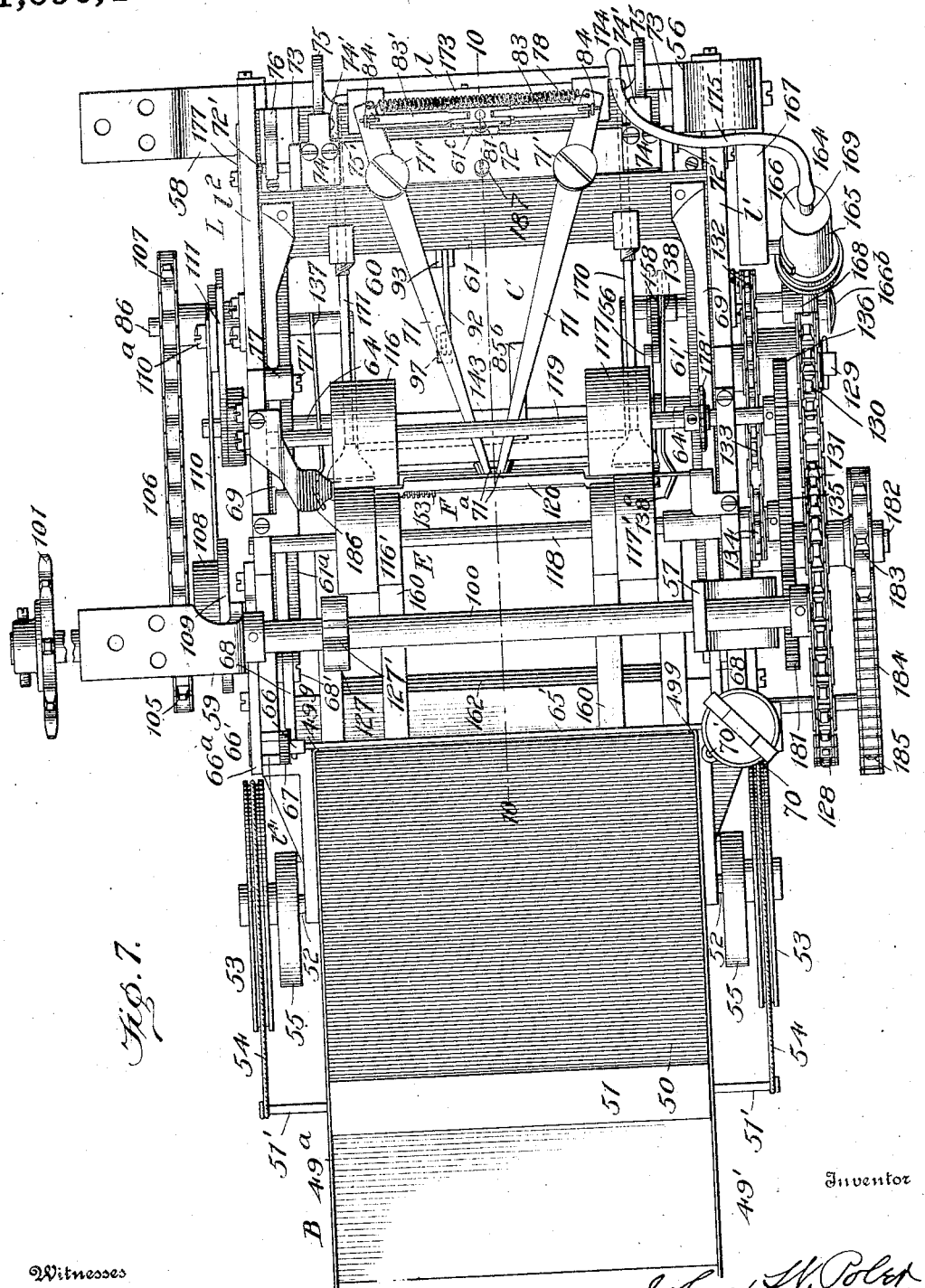

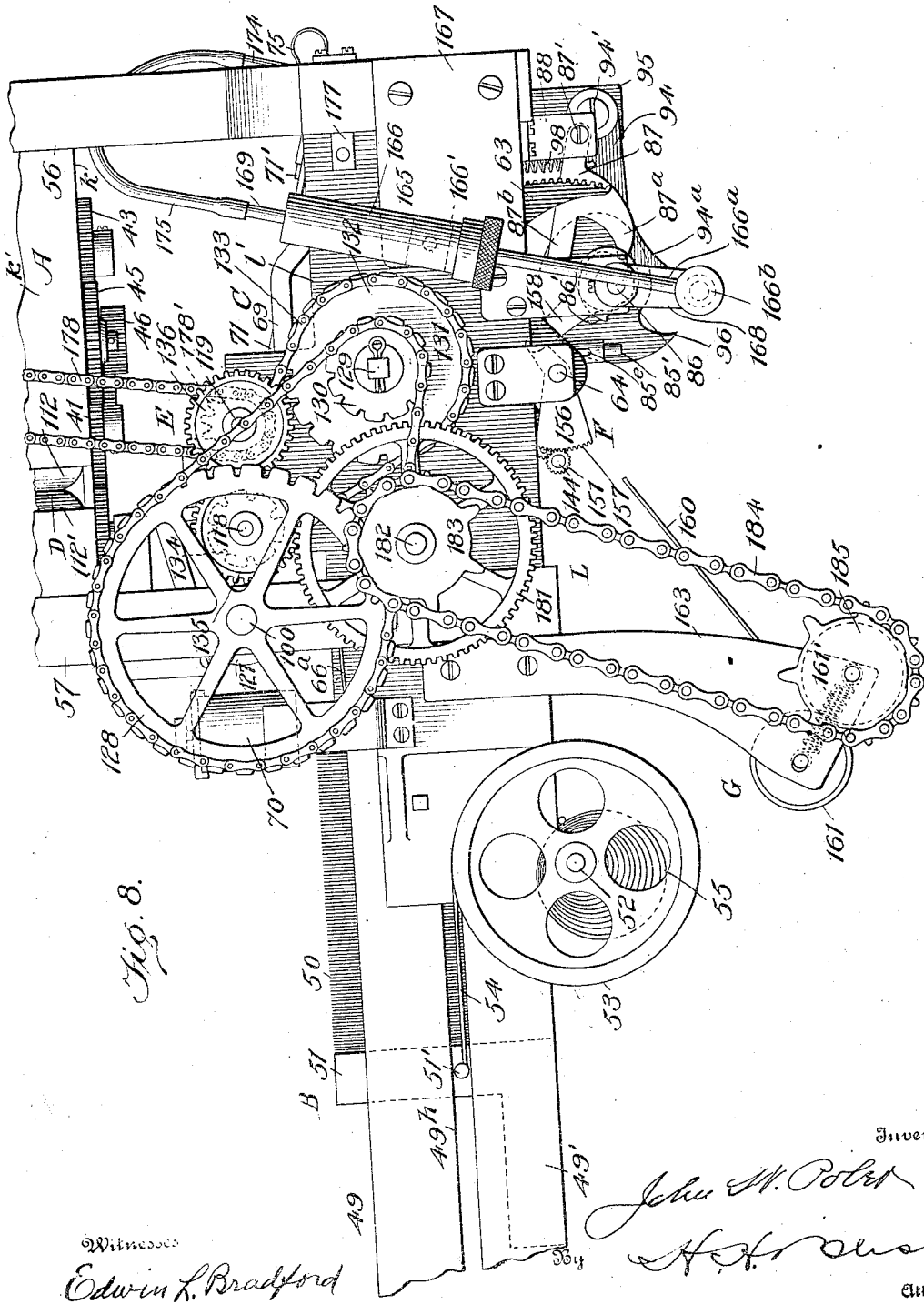

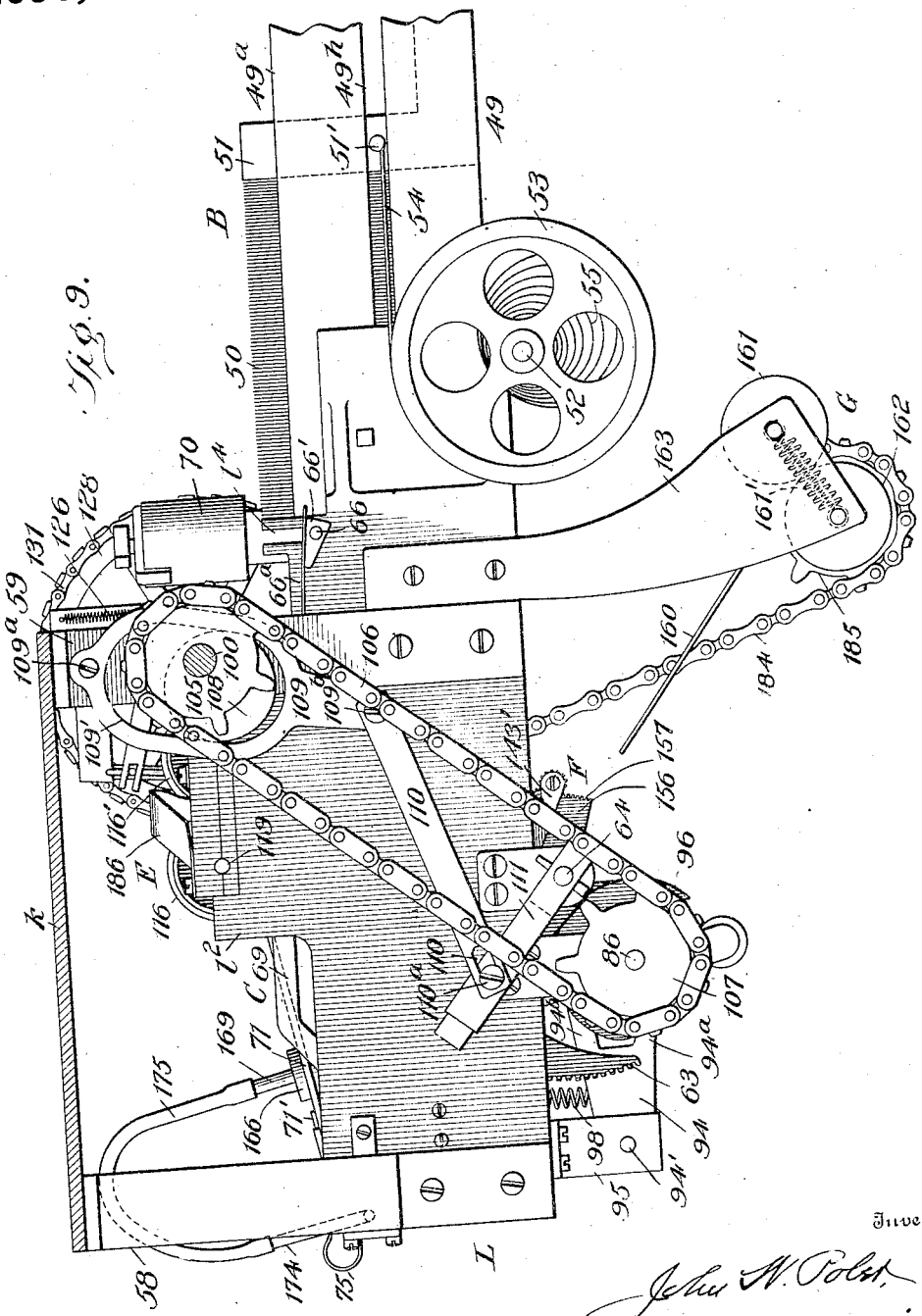

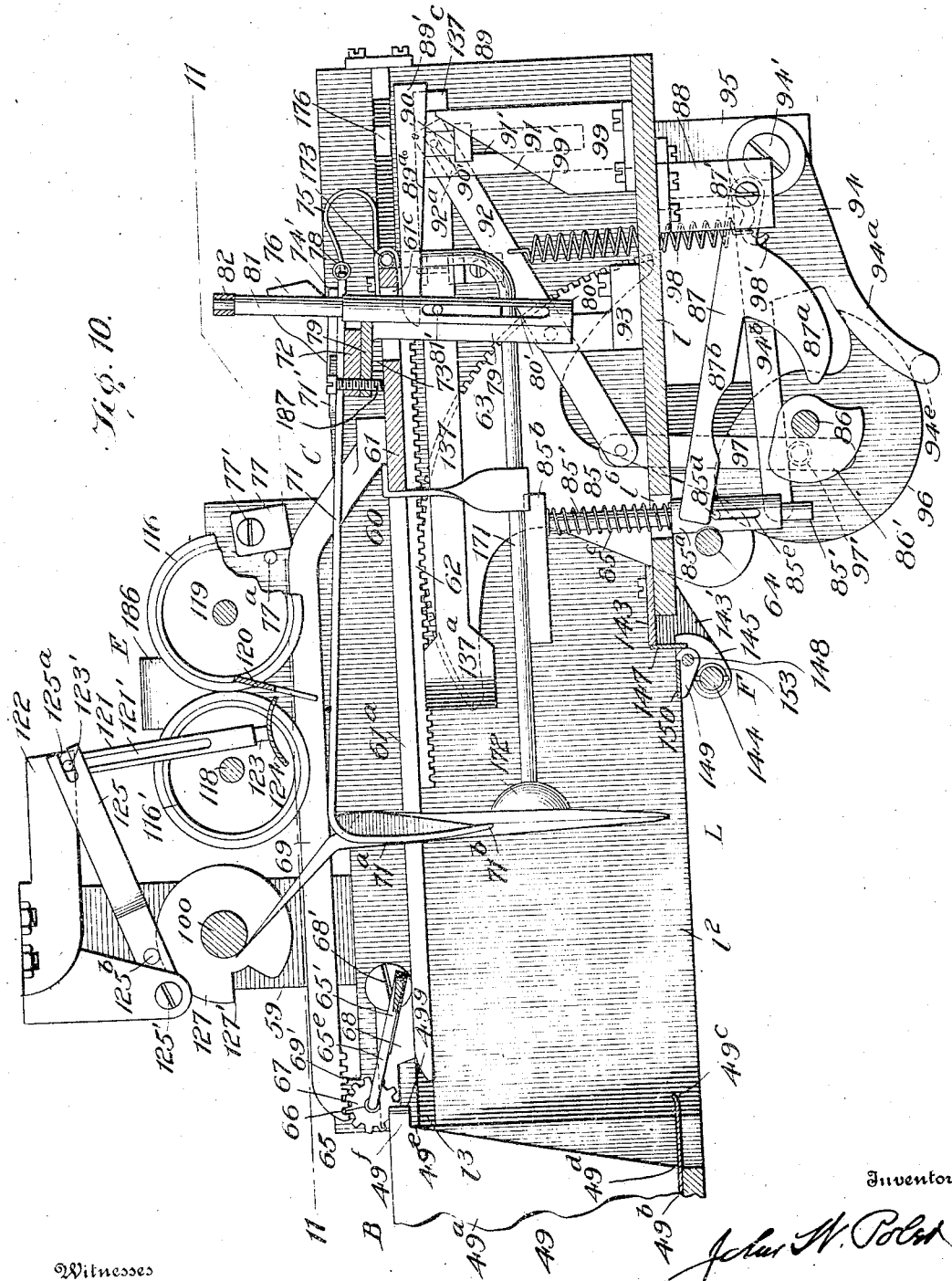

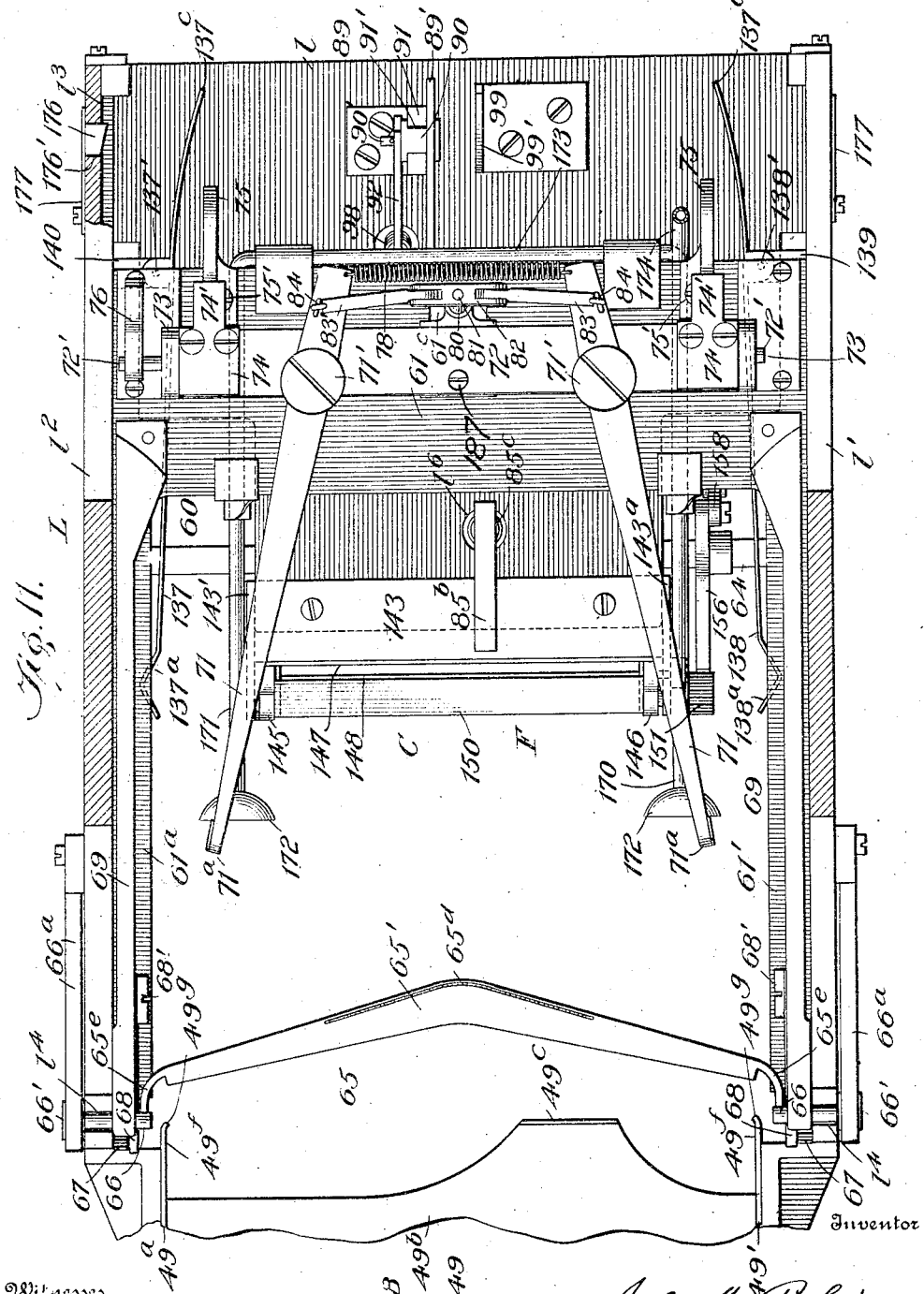

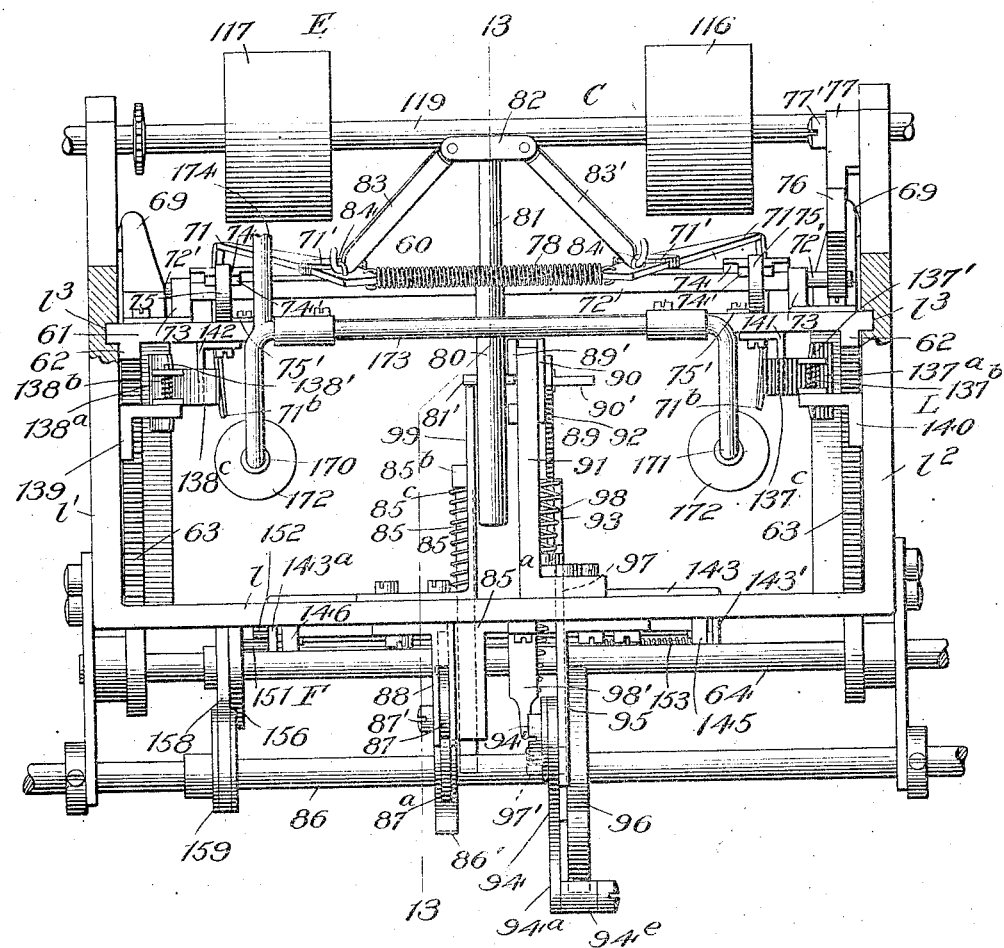

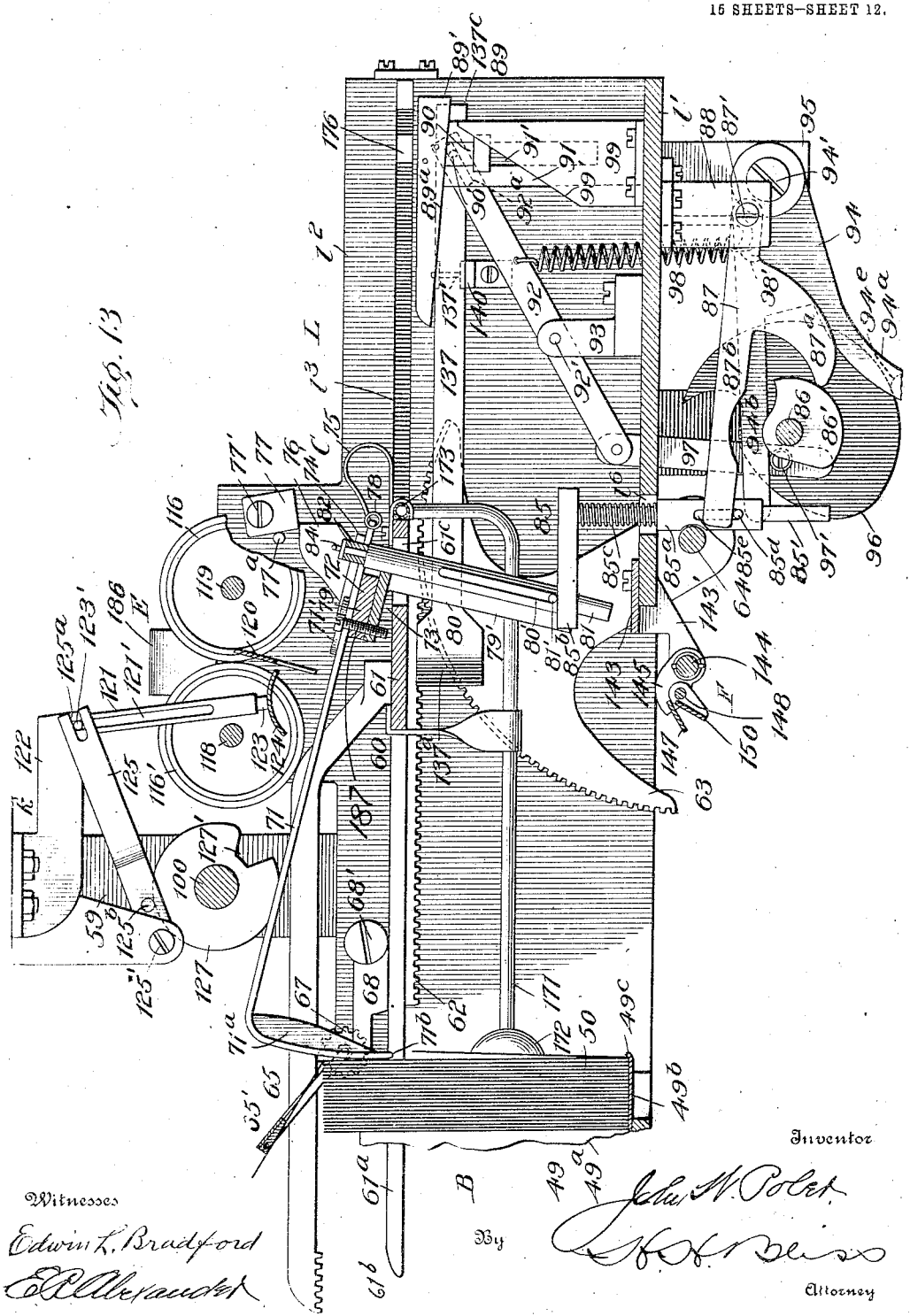

J. W. POLER.
MACHINE FOR PREPARING MAIL MATTER FOR POSTING.
APPLICATION FILED DEC. 18, 1905.
1,090,499.
Patented Mar. 17, 1914.
16 SHEETS—SHEET 13.
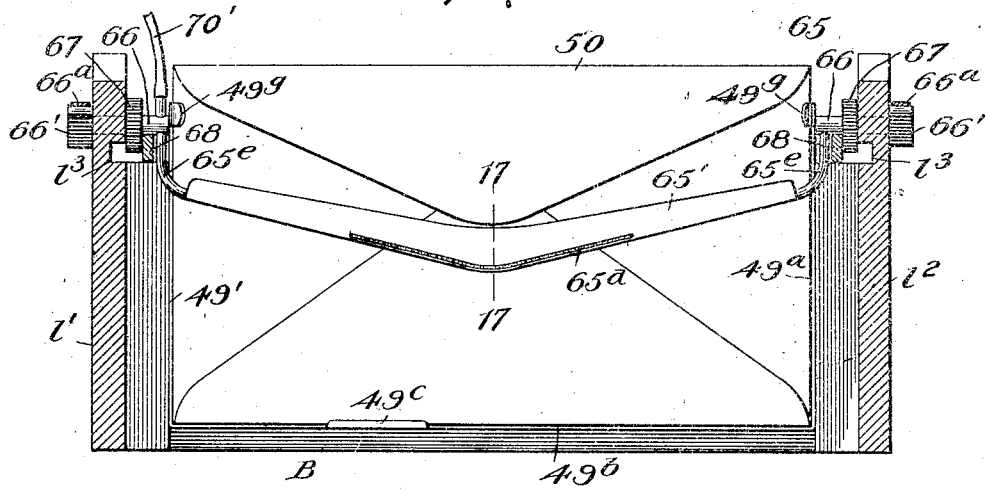
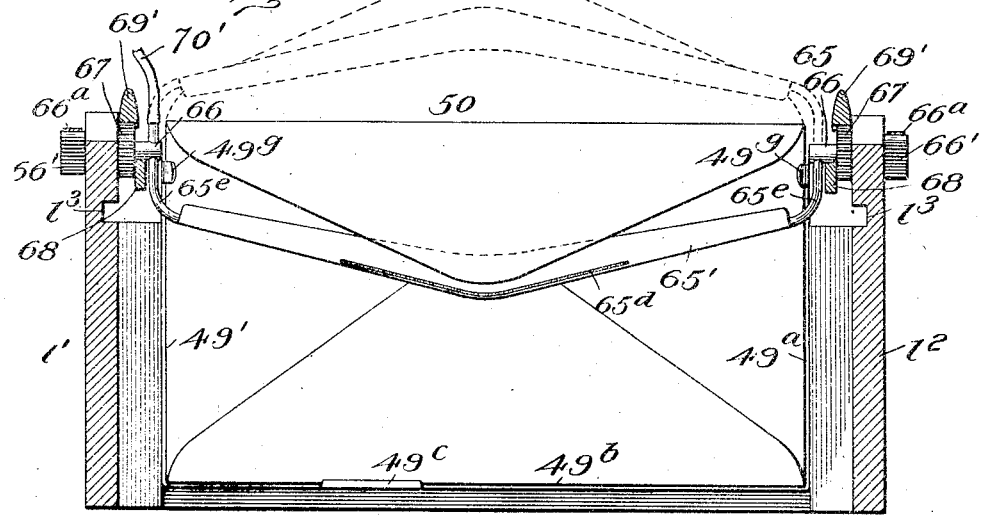
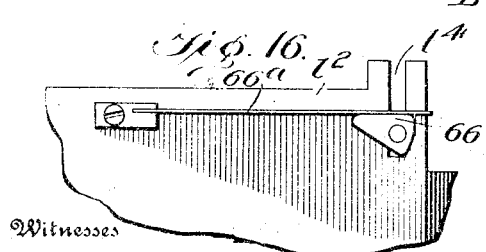
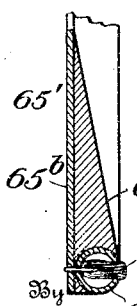

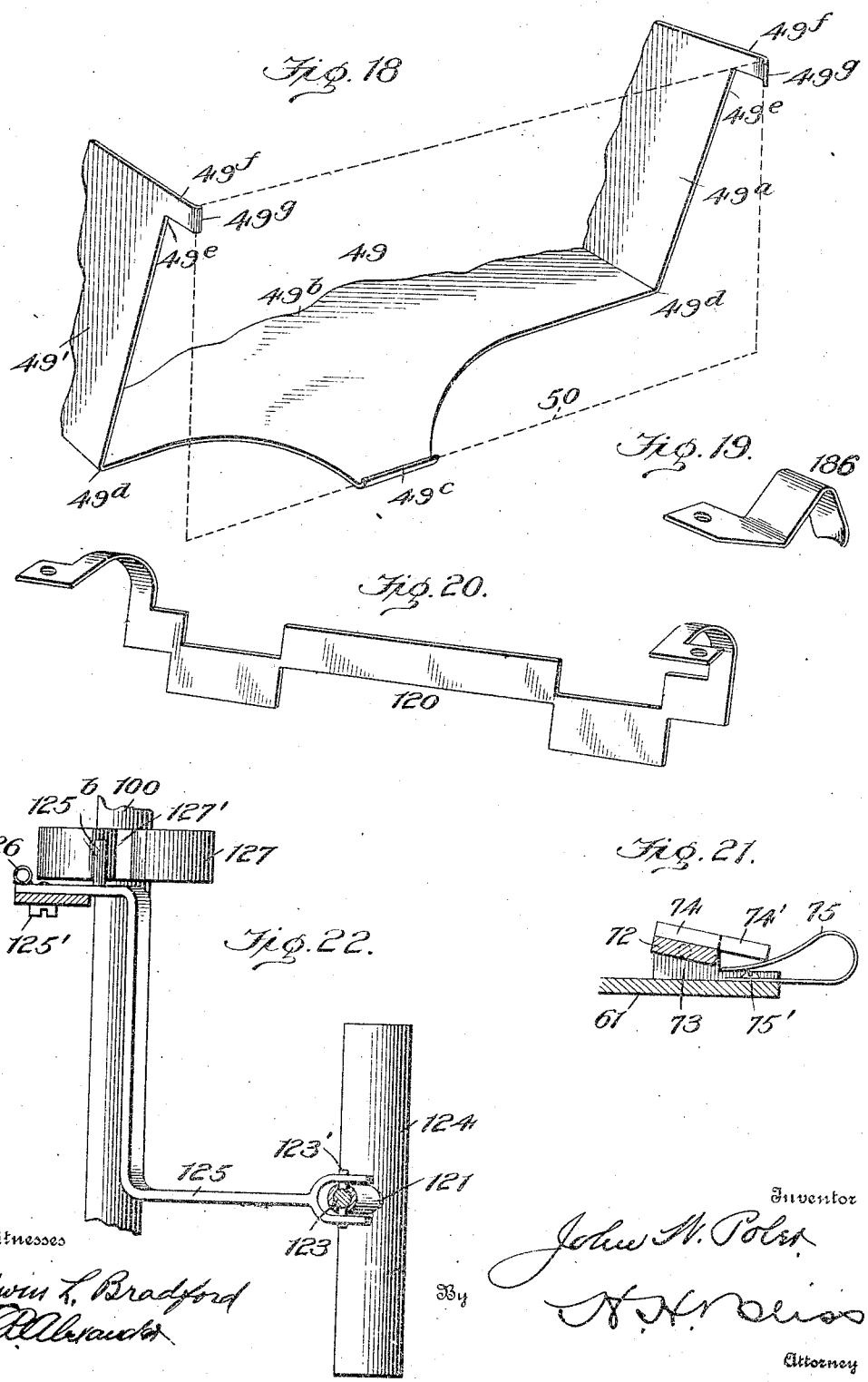

J. W. POLER.
MACHINE FOR PREPARING MAIL MATTER FOR POSTING.
APPLICATION FILED DEC. 18, 1905.
1,090,499.
Patented Mar. 17, 1914.
15 SHEETS—SHEET 15.
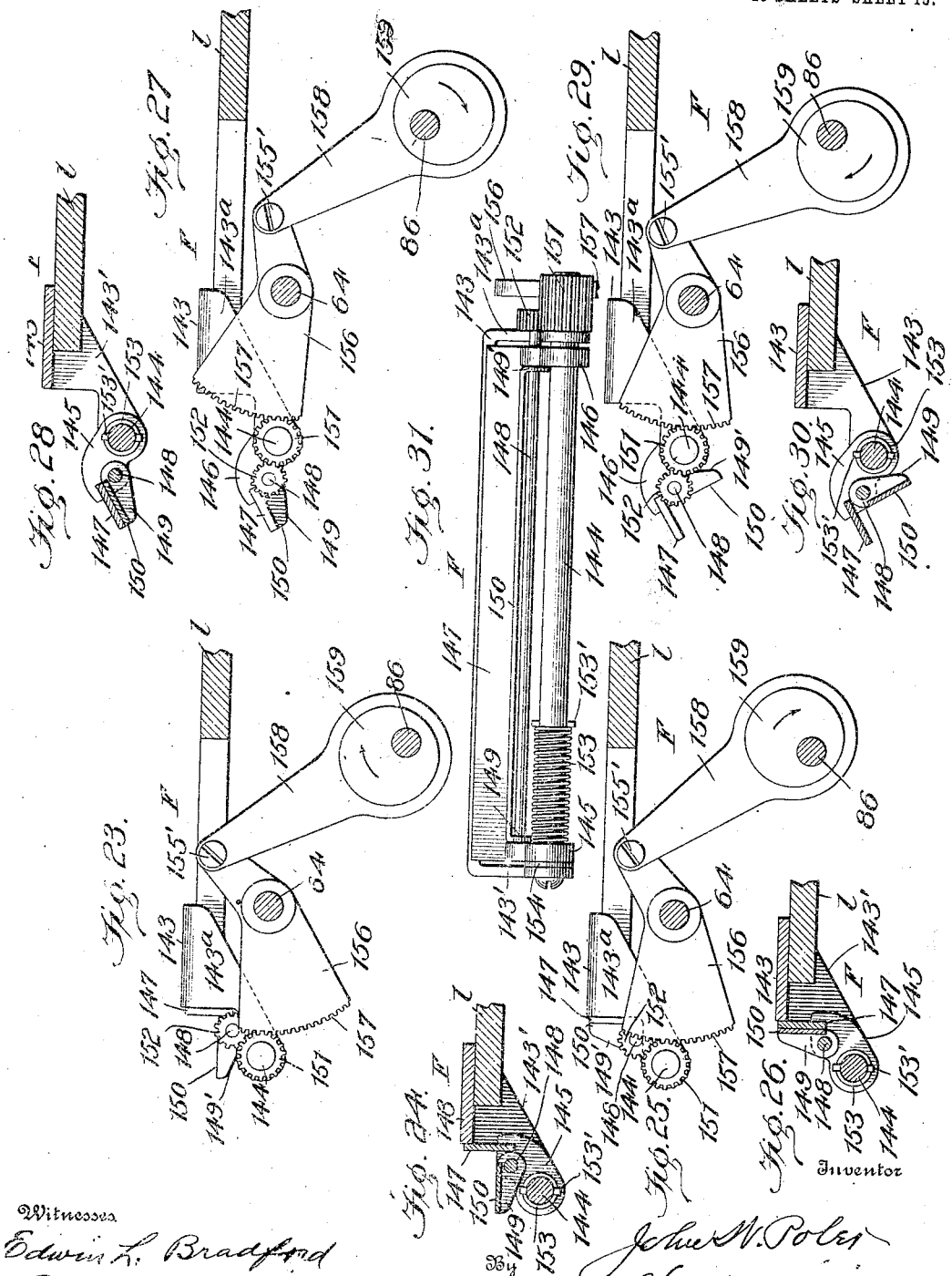

UNITED STATES PATENT OFFICE.

JOHN W. POLER, OF TAKOMA PARK, MARYLAND, ASSIGNOR TO MOLYNEUX MAILING MACHINES COMPANY, OF BUFFALO, NEW YORK, A CORPORATION OF SOUTH DAKOTA.

MACHINE FOR PREPARING MAIL-MATTER FOR POSTING.

1,090,499.  Specification of Letters Patent.  Patented Mar. 17, 1914.

Application filed December 18, 1905. Serial No. 292,386.

*To all whom it may concern:*

Be it known that I, JOHN W. POLER, a citizen of the United States, residing at Takoma Park, in the county of Montgomery and State of Maryland, have invented certain new and useful Improvements in Machines for Preparing Mail-Matter for Posting, of which the following is a specification, reference being had therein to the accompanying drawing.

This invention relates to mechanism for folding a sheet or sheets of paper or a circular, taking an envelop from a pack, opening the envelop, inserting the folded sheet or circular into the envelop and then sealing the envelop.

The object of the invention is to provide a machine which will automatically perform the above set forth functions rapidly, accurately and economically.

I will, for the purpose of illustration, herein set forth and describe one mechanism embodying my improvements, although it will be understood that I do not desire to limit myself to the precise arrangement of parts and details of construction shown in the drawings.

Figure 1 is a front elevation of a machine embodying my improvements. Fig. 2 is a section on line 2—2, Fig. 1, showing only the upper portion of the machine. Fig. 3 is a section on the line 3—3, Fig. 1, showing only the upper portion of the mechanism. Fig. 4 is a section on the line 4—4, Fig. 1, showing the upper portion only of the folding mechanism. Fig. 4ª is a detail of the operating cam and levers for the folding blade which directs the sheet or sheets of paper to the initial pair of folding rolls. Fig. 5 is a section on the line 5—5, Fig. 1, some of the power transmitting parts on the right hand end of the machine being omitted. Fig. 6 is a section through the machine on the line 6—6, Fig. 1, a portion only of the folding mechanism being shown. Fig. 7 is a plan view of the parts beneath the folding mechanism. Fig. 8 is a side elevation of a portion of the machine, looking from the left in Fig. 1. Fig. 9 is a side elevation of a portion of the machine, looking from the right in Fig. 1. Fig. 10 is a section on the line 10—10, Fig. 7. Fig. 11 is a section on the line 11—11, Fig. 10. Fig. 12 is an enlarged view of a portion of the mechanism beneath the folding mechanism, looking in from the front of the machine. Fig. 13 is a section on the line 13—13, Fig. 12. Fig. 14 is a detail view showing an envelop with the envelop-flap-opening and moistening blade in position to be elevated and to engage and open the flap. Fig. 15 is a detail view showing the said blade elevated beneath the flap and engaging therewith, the dotted lines showing the position of the flap and the opening blade when the flap has been thrown upward and backward. Fig. 16 is a detail of the yielding mounting for the ends of the envelop-flap-opening and moistening blade. Fig. 17 is a section on the line 17—17 through the said blade. Fig. 18 is a perspective view of the inner end of the envelop tray. Figs. 19, 20, and 21, are details. Fig. 22 is a plan view of the plunger mechanism for forcing the folded sheet or sheets down into the envelop. Fig. 23 is a side elevation of the mechanism adapted to grip the envelop after the sheet has been inserted and to direct the envelop to the sealing rolls, the envelop-gripping jaws being shown open. Fig. 24 is a sectional view of the same. Fig. 25 is a view of this mechanism showing the gripping jaws closed together. Fig. 26 is a sectional view of the same. Fig. 27 is a side elevation of this mechanism showing the gripping jaws thrown down into the position in which they deliver the envelop. Fig. 28 is a sectional view of the same. Fig. 29 is a side elevation of this mechanism showing the gripping jaws open and the envelop released. Fig. 30 is a sectional view of the same. Fig. 31 is a rear view of this envelop-gripping mechanism in elevation.

In the drawings, A represents as an entirety the folding mechanism.

B indicates as an entirety the mechanism for feeding the envelops to be filled to the envelop-opening and positioning part, which is indicated as an entirety by C.

D indicates as an entirety the mechanism for directing the folded sheets from the folding mechanism to the sheet-inserting mechanism which is indicated as an entirety by E and which is arranged to direct the sheet into the envelops which are held open in proper sheet-receiving position.

F indicates as an entirety the mechanism for gripping the envelops after they have been filled and directing and delivering them to the sealing mechanism which is indicated as an entirety by G.

All of the aforesaid mechanisms are arranged in such relation to each other as to effect the substantially continuous action upon the sheet to be folded and inserted and also upon the envelop so as to insure great rapidity of action, and for this purpose I have preferably arranged them all upon a framework which is indicated as an entirety by H. For illustration: I have shown a foot-power motor indicated by I as a means for supplying power for simultaneously operating the various elements of which the machine consists, but it will be understood that I do not limit myself to any particular style of motor, as any of the types or classes of motor now well known, may be readily employed.

*Folding mechanism.*—1 is a horizontally arranged table or platform adapted to receive a sheet or sheets to be folded. It is provided with guides $1^a$, $1^a$, which are arranged to be engaged by the sheet in order to properly position it to be acted upon by the sheet-directing blade for the initial pair of folding rolls. This blade is indicated by 2 and is carried by arms $2'$, $2'$, which are rigidly secured at their lower rear ends upon a transversely arranged shaft 3 mounted in bearings at either side of the folding mechanism in the side walls of a supplemental frame K depending from the table 1.

$3'$ is a lever arm rigidly secured at one end to the shaft 3 and extending forwardly therefrom. At its inner free end it has pivotally secured to it the upper end of an arm $3^a$ which at its lower free end has an inward turn or projection $3^b$.

$3^c$ is a spring tending normally to swing the arm $3^a$ rearwardly about the axis of its pivotal connection with the arm $3'$.

$3^d$, $3^d$, are arms or levers rigidly secured to the shaft 3 at either end thereof and on the outside of the walls $k'$, $k^2$. These arms $3^d$, $3^d$, are controlled by springs $3^e$ which tend normally to pull upwardly on the arms and to rotate the shaft 3 so as to hold the folding blade 2 in its elevated position.

4, $4'$, indicate an initial pair of folding rolls arranged horizontally of the machine and mounted at either end in the side walls of the supplemental frame K. These rolls are adapted to initially receive the sheet to be folded, the sheet or sheets being directed between the rolls by means of the aforesaid directing blade 2. Either one or both of these initial folding rolls is mounted so as to allow for its lateral movement relative to the other one. I have indicated only the roll 4 as so mounted, $4^a$ being springs bearing against the roll shafts at points adjacent to their bearings and adapted to press the roll 4 yieldingly into engagement with its co-operating roll $4'$. The supplemental frame K for the folding mechanism comprises the horizontal bottom wall $k$ and the side walls $k'$, $k^2$.

5, 5, indicate vertically arranged sheet guides located immediately beneath the initial folding rolls in the vertical plane of tangency of the rolls. These guides are adapted to receive the sheet from the initial pair of folding rolls and direct it downwardly and hold it in proper position to be directed between the second pair of folding rolls which are indicated by 6, $6'$. This second pair of folding rolls are vertically arranged and have their plane of tangency at right angles to the plane of tangency of the rolls of the initial folding pair. The rolls 6, $6'$, are furthermore arranged at one side of the center of the folded sheet as it is held in position by the guides 5, 5. At least one of them is mounted so as to be capable of lateral movement relative to the other one and is held yieldingly in engagement with the other one by means of springs $6^a$.

7 indicates a vertically arranged folding blade for directing the sheet between the rolls 6, $6'$. This folding blade is carried by a swinging arm 8 which is pivotally connected at its outer end to the wall $k^2$ of the supplemental frame as indicated at $8'$.

9 is a vertically arranged support and guide frame for the folding blade 7.

$9'$ are grooved guides carried by the standard or frame 9 and adapted to receive the arms $7'$ carried by the blade 7. These arms work back and forth in the guides and insure the proper positioning and movement of the folding blade 7. It carries also the laterally extending arms $9^a$, $9^a$, in which are loosely mounted rods 10, secured at their inner ends to the folding blade and carrying at their outer ends nuts which are adapted to limit the inward movement of the said folding blade.

11 is a spring secured at one end to the swinging arm 8 and at its other end to the wall $k^2$ of the supplemental frame K. The purpose of this spring is to normally hold the arm 8 in such position as to maintain the folding blade 7 in front of the vertical transverse plane of the guides 5, 5. At its outer end the swinging arm 8 has a rearward extension $8^a$ the purpose of which will be hereinafter set forth.

12, $12'$, indicate sheet-directing and advancing rolls arranged parallel with the rolls 6, $6'$, and having the same vertical plane of tangency as the rolls 6, $6'$. These directing and advancing rolls are arranged closely adjacent to the second pair of folding rolls and are adapted to receive the sheet of paper therefrom and to advance it and direct it to the third and final pair of folding rolls which are indicated by 13, $13'$. At least one of the rolls 12 or $12'$ is mounted so as to be capable of lateral movement relative to the other and is held in yielding engagement with the other one by means of springs 12ª. At least one of the rolls 13 or 13' is also mounted so as to be capable of lateral movement relative to the other one and it is held in yielding engagement with its coöperating roll by means of springs such as 13ª. The rolls 13, 13', are vertically arranged, as shown, to have their plane of tangency at right angles to the plane of tangency of the rolls 6, 6'. As the sheet is advanced from the second pair of folding rolls by the rolls 12, 12', it is directed into proper position relative to the rolls 13, 13', by means of the guides 14, 14'.

15 indicates a folding blade for directing the sheet between the rolls 13, 13'. This folding blade is vertically arranged, as shown, and has the laterally extending arms 15', the free ends of which engage with the walls of the grooved guides 16' carried by the standard 16. The folding blade 15 has extending rearwardly from its central portion an operating arm or bar 17, which at its outer end is connected with the free end of a swinging arm or lever 18 pivotally mounted at 18' to a lug or projection carried by the wall $k^2$.

18ª is an arm extending outwardly from the lever or arm 18 through an opening in the wall $k^2$ and having its free end adapted to be engaged by the means for operating or swinging the lever or arm. The arm 18 is normally held so as to maintain the blade 15 out of the path of the travel of the sheet in the guides 14, 14' by means of a spring 18ᵇ. The paper guides 5, 5, and 14' are all adjustable as shown in Fig. 5 to accommodate them readily to the width of the sheet to be folded.

The power for operating the folding mechanism is applied from the main drive shaft which is indicated by 19. This drive shaft is arranged, as shown, transversely of the machine and is mounted in bearings carried by the frame H.

20 is a counter shaft mounted in bearings at 20', 20ª, the former being carried by the wall $k^2$ of the supplemental folding frame and the latter being carried by a U-shaped bar or bracket 21 secured to the said wall.

22 is a fly-wheel carried by the main drive shaft 19. This shaft also has secured to it a sprocket wheel 23 which is connected by a chain 24 to a sprocket wheel 25 rigidly secured to the counter shaft 20.

26 is a combined gear and cam-wheel rigidly secured to the counter shaft 20. The purpose of this wheel is both to operate the folding blades for the second and third pairs of rolls and to transmit power for operating the various pairs of rolls.

27 is a cam rigidly secured to the inner end of the counter shaft 20, the cam surface of which is adapted to be engaged by the end of the projection 3ᵇ on the arm 3ª. This cam surface is so formed as to have an offset shoulder 27', which is adapted to engage with the extension 3ᵇ and to pull the arm 3ª forward and downward, at the same time rocking the arm 3' in such manner as to rotate the shaft 3 and thereby cause the downward travel of the folding blade 2 so as to direct the sheet to be folded between the initial pair of folding rolls. After the shoulder 27' of the cam 27 has effected the forward and downward travel of the arm 3ª for a predetermined distance, the extension 3ᵇ on the said arm rides up over the said shoulder and the arm 3ª is released and is immediately swung back into normal position by means of the spring 3ᶜ.

28 is a cam projection or lug carried by the wheel 26 on its outer side. The cam surface of this lug or projection 28 is adapted to engage with the upturned portion of the rearward projection or arm 8ª on the lever 8, and when so engaging, to rock the said lever about the axis of its pivotal connection 8' so as to effect the rearward travel of the folding blade 7 and to cause it to direct the sheet to be folded between the second pair of folding rolls 6, 6'. When the cam projection 28 has passed out of engagement with the arm 8ª the said arm is at once released and the lever 8 is drawn back into normal position by the spring 11.

29 is a cam projection or lug carried on the inner face of the wheel 26. The cam surface of this lug is adapted to engage with the outer end of the arm or extension 18ª of the lever 18 and to force the said arm or projection inwardly in such manner as to swing the lever 18 about the axis of its pivotal connection at 18' and to simultaneously cause the folding blade 15 to advance in such manner as to direct the sheet to be folded between the rolls 13, 13'. The spring 18ᵇ serves to swing the lever 18 back into normal position as soon as the cam projection or lug 29 has passed out of engagement with the extension 18ª on the said lever.

30 is a transversely arranged shaft mounted near either end in bearings carried by the walls $k'$, $k^2$ of the supplemental folder frame K.

31 is a gear wheel rigidly secured to the said shaft 30 at the fly-wheel end of the machine and adapted to mesh with and be driven by the gear wheel 26.

32 is a gear wheel rigidly secured to the shaft 30 at the outside of but immediately adjacent to the wall $k'$ of the shoulder frame.

33, 34, are inter-meshing gear wheels of equal pitch diameter secured to the roll shafts of the initial folding rolls 4, 4', respectively. Power is transmitted from the gear wheel 32 to the gear wheel 34 through

mounted a portion of the mechanism for opening the envelop, removing it from the tray, advancing it to the point at which the sheet is to be inserted, and then releasing it.

The carriage has a transverse horizontally arranged plate or platform 61, which at either end fits into a groove $l^3$ in the adjacent wall of the supplemental frame L, and engages with the walls thereof. This plate has extending forward from it, at either side, relatively narrow longitudinally arranged members 61' and 61ª which at their outer edges are likewise fitted into the adjacent grooves $l^3$.

62 are rack bars each arranged at either side of the machine upon the under side of the platform-like parts 61, 61', and 61ª.

63, 63, are segmental gears arranged at either side of the machine and adapted to mesh with the adjacent rack-bar 62. These gears are secured to and are operated by a transversely arranged shaft 64 which is mounted in bearings at either side of the bottom wall $l$ of the trough by which they are carried.

The mechanism for engaging the flap of the envelop and forcing it upward and backward is indicated by 65. It is mounted at the rear end of the supplemental frame L closely adjacent to the point at which the innermost envelop in the envelop tray is held. It comprises a transversely mounted blade 65' which is curved into a shape somewhat similar to the shape of the edge of the free flap of the envelop and is made up of a thin triangular strip of metal 65ª backed by a flat piece of metal 65ᵇ, the triangular strip having fitted into its base end a duct 65ᶜ for the passage of water or some mucilaginous substance, this duct having extending therefrom on the side of the flap-opener which engages with the flap, either wicking, such as is indicated at 65ᵈ, or some spongy substance which will transfer water or the mucilaginous substance to the gummed surface on the inside of the loose flap of the envelop. At either side, this flap-engaging blade and moistener has curved arms 65ᵉ which are secured at their outer ends to stub shafts 66 which extend outward through vertically arranged slots $l^4$ in the adjacent walls $l'$, $l^2$ of the carriage frame.

66' are triangular shaped spring pressed bearing plates each secured to one of the said stub shafts 66 on the outside of the said walls of the carriage frame.

66ª are springs secured at their front ends to the adjacent frame walls and having their rear free ends adapted to engage with and bear downwardly upon the surface of the adjacent triangular shaped plate 66'. These springs serve normally to force the shafts 66 downward to the bottom of the slot $l^4$, in which position they hold the envelop-flap-engaging and opening blade 65 at a point beneath the free flaps on the envelops as indicated in Fig. 14.

67, 67, are pinions rigidly secured to the shafts 66 inside of and immediately adjacent to the side walls of the carriage frame.

68 are swinging plates or blocks pivotally mounted to the adjacent side walls of the carriage frame so as to swing about a horizontal axis 68', these plates being so arranged as to have their under edge or surface engaged by the upper surface of the adjacent forwardly-extending plate 61' or 61ª of the carriage frame. These forwardly-extending plates are curved or rounded at their forward ends, as indicated at 61ᵇ so as to force their way under the plates 68 as the carriage platform starts inward toward the envelop tray. The plates 68 have a forwardly-extending arm the upper surface of which is adapted to engage with the under surface of the adjacent stub shaft 66 and to elevate the said shaft against the resistance of the springs 66ª. These plates 68 are so loosely mounted upon their pivots, that when the carriage is moved to the front end of the machine and the plates 61', 61ª, of the carriage platform are withdrawn from engagement with them, they will swing down under the action of gravity and will permit the springs 66ª to act to force the flap-opening and moistening blade 65' into its lowermost position. The upper edge of the off-set portions at $l^5$ of the side walls of the carriage frame serve as stops for the downward travel of the plates 68 and prevent their swinging beyond the distance necessary to allow the shafts 66 to travel downwardly to their lowermost positions.

69 are rods or bars secured at their inner ends to the transverse plate 61 of the carriage frame and extending rearward therefrom longitudinally of the frame at either side thereof and carrying at their extreme rear ends short rack sections 69' which are adapted to engage with and rotate the adjacent pinions 67 on the shafts 66 when the said pinions are in their uppermost position and when the said racks 69' are traveling over them. It is by means of these racks and pinions that the envelop-flap-opening and moistening blade is caused to swing upwardly about the axis of the shafts 66 and then rearwardly a predetermined distance, as shown in Fig. 13, and to again swing back to the position shown in Fig. 15.

The substance for moistening the sealing compound on the inner side of the free envelop flap, or a mucilaginous substance, may be forced through and from the duct 65ᶜ in the flap-opening moistening blade by means of a receptacle or reservoir 70 containing the substance, and connected to the hollow arm 65ᵉ at one end of the said blade by means of a flexible tube 70'. When desired, a force-feed mechanism of any well known type may be employed at 70 for forcing the substance from the reservoir through the duct 65ᶜ.

The mechanism for opening the envelop, removing it from the envelop tray, and advancing it to the point at which it is to receive the folded sheet or sheets, is mounted upon and travels with the carriage 60.

71, 71, are envelop-opening arms, each extending longitudinally of the carriage and pivoted near its front end on a substantially vertical axis, as indicated at 71', to a rocking plate 72 mounted on the carriage. This rocking plate 72 is mounted transversely of the carriage above the transverse plate 61 at about the middle thereof.

72', 72', are studs or shafts extending from the ends of the plate 72 and mounted in bearing plates 73, 73, secured at the upper side of the plate 61 at either side thereof.

74, 74, are blocks or plates rigidly secured to the upper face of the plate 72 inside of and immediately adjacent to the bearing plates 73. Each of these plates 74 has a forwardly extending projection 74', the under surface of which is adapted to be engaged by the upper prong or leaf of a looped spring 75, the lower prong or leaf of which is secured at 75' to the transverse plate 61 of the carriage. The purpose of these springs is to exert a normal tendency to swing the plate 72 and the envelop-opening and advancing arms 71 downward around the axis of the shafts 72'.

76 is a cam secured to one of the shafts 72', at one side of the rocking plate 72. The upper surface of this cam is adapted, as the carriage moves rearward toward the envelop tray, to engage with a coöperating block or plate 77 which is pivotally mounted at 77' to the adjacent side wall $l^2$ of the supplemental carriage frame. This block or plate 77 is prevented from swinging in a clockwise direction, as shown in Fig. 13, by means of a stud or pin 77ᵃ secured to the side wall $l^2$. As the cam 76, traveling forward with the carriage, engages with the plate 77, it tends to rock the plate 72 about the axis of its pivotal or hinged connection in such manner as to elevate the rearward ends of the arms 71, as indicated in Fig. 13. Each arm 71, at its rear end, has a downwardly turned finger or envelop-opener 71ᵃ. Each of these fingers preferably tapers downwardly in a vertical longitudinal plane of the machine, as indicated, and terminates in a relatively small point 71ᵇ. This point is adapted first to enter between the front and rear walls or sides of the envelop and as the fingers descend into the envelop, their tapered surfaces tend to separate the front from the rear wall thereof in such manner as to hold the envelop open to receive the folded sheet or sheets.

78 is a coil tension spring connected at either end to the rear end of the adjacent arm 71. This spring connects the arms together in such way as normally to tend to swing the fingers 71ᵃ away from each other or into their spread-apart position in which they serve to hold the envelop open and to advance it to receive the folded sheet or sheets. The mechanism for closing the envelop-opening finger 71ᵃ together against action of the said spring and of then releasing them so as to permit the spring to act and force them apart, is mounted partly upon the carriage 60 and partly upon the bottom wall $l$ of the carriage-supporting frame L.

61ᶜ is a centrally arranged vertical opening or passageway through the platform or plate 61.

79 is a plate or bracket rigidly secured to the under surface of the rocking plate 72 and having the downwardly-extending arm 79' arranged at right angles to the plate 79 and extending downward through the opening 61ᶜ in the carriage platform 61 to a point considerably beneath the same. This downwardly-extending arm 79' has secured to it a tubular guide 80 which extends up through the opening 61ᶜ in the carriage platform to a point in substantially the same plane as the upper surface of the rocking plate 72. This tubular guide is longitudinally slotted at either side as indicated at 80'.

81 is a cylindrical bar or rod fitted into the guide 80 and arranged to reciprocate therein. It is held from rotation within and relative to the guide by means of a pin 81' carried by the rod 81 and having its ends extending through the slots 80' at either side of the tubular guide 80.

82 is a head or bar arranged at right angles to the reciprocating rod 81 and rigidly secured to the upper end thereof transversely of the carriage.

83, 83', are toggle links, each pivotally connected at its inner end to one of the ends of the plate or bar 82 and each having its outer end connected by a universal joint 84 to the adjacent front end of the adjoining arm 71. When the rod 81 is forced downward toward the carriage platform the links 83, 83', are caused to assume a horizontal position and to force outwardly the front ends of the arms 71, in consequence causing their rear finger-carrying ends to approach each other and bring the fingers 71ᵃ into position in which they are to either enter or be withdrawn from the envelop. When the rod 81 has been depressed until the plate or bar 82 and the links 83, 83', are in the same horizontal plane, it will be noted that the mechanism is locked or held in its position by means of the spring 78 which then exerts a straight line tension through the said elements and consequently holds them substantially in axial alinement until they are forced out of the same by some force tending to elevate the reciprocating rod 81.

85 indicates a mechanism for acting upon the reciprocatable rod 81 in such manner as to elevate it and thereby permit the spring 78 to operate to separate the envelop-opening fingers 71ª. Of this mechanism, 85' is a reciprocating rod vertically mounted in a bearing bracket 85ª secured to the under surface of the bottom plate $l$ of the carriage frame. This rod extends upward through an opening $l^c$ in the said plate and has secured transversely to its upper end a horizontal bar 85$^b$ arranged longitudinally of the carriage and in the same vertical longitudinal plane as a portion of the pin 81' which extends through the slot 80' in the cylindrical guide 80. The upper surface of this bar 85$^b$ is adapted to engage with the pin 81' and to elevate the rod 81 so as to release the spring 78 and permit the instantaneous separation of the fingers 71ª.

85$^c$ is a spring interposed between the bar 85$^b$ and the bearing 85ª and is adapted normally to exert an upward pressure on the said bar. The vertical travel of the bar is limited by a pin 85$^d$ carried by the rod 85' and engaging with the walls of a longitudinal slot 85$^e$ in the bearing 85ª.

86 is a transversely arranged shaft mounted in bearings at either side of the carriage frame L and at a point beneath the bottom wall $l$ thereof.

86' is a cam rigidly secured to said shaft and adapted to operate a lever 87 which is pivotally mounted at 87' to a bracket 88 secured to the bottom wall $l$ of the carriage frame. This lever arm has a downwardly-extending cam-like lug or projection 87ª and a rearwardly-extending arm 87$^b$. At its rear end this arm 87$^b$ is adapted to engage with the pin 85$^d$ carried by the reciprocatable rod 85'. The cam 86' has a surface which is adapted once in each revolution of the cam to alternately force the lever 87 downward about the axis of its pivotal connection, thereby forcing the bar 85$^b$ downward against the action of the spring 85$^c$ and then releasing the lever arm 87, so as to permit the bar 85' to travel upwardly and to impart upward motion to the reciprocatable rod 81.

89 indicates as an entirety mechanism for effecting the downward travel of the reciprocatable rod 81 and the consequent closing together of the fingers 71ª. Of this mechanism, 89' is a vertically reciprocatable arm arranged longitudinally of the carriage mechanism and having the under inclined surface 89ª. This arm is secured to a sliding block 90 which moves up and down in a guideway 91' in a vertical standard 91 which is secured to the bottom wall $l$ of the carriage frame.

92 is a lever arm pivotally mounted at 92' in a bracket 93 secured to the said wall $l$. At the front end this lever arm is longitudinally slotted as indicated at 92ª.

90' is a pin or pivot carried by the guide block 90 and extending through the slot 92ª in the lever 92 and adapted to engage with the walls thereof.

94 is a lever or rocking plate pivotally mounted at its rear end, as indicated at 94', to a bracket 95 depending from the wall $l$. This lever or rocking plate is preferably bifurcated, having the arms 94ª and 94$^b$. The former at its rear end carries a cam roller 94$^e$ which is adapted to engage with the cam surface of a cam 96 rigidly secured to the shaft 86.

97 is a link pivotally connected at its upper end to the rear end of the lever 92 and extending thence downward through the bottom wall of the carriage frame and carrying near its lower end an anti-friction roller 97'. This anti-friction roller 97' is in the same vertical longitudinal plane as the arm 94$^b$ of the lever 94 and is adapted to engage with the under rear surface of the said arm.

98 is a spring secured at its upper end to the lever arm 92 and at its lower end to a bracket 98' carried by the bottom wall $l$ of the carriage frame. The arm or plate 89' is arranged in the same vertical longitudinal plane of the mechanism as the extension of the pin 81' on the right hand side of the reciprocatable rod 81, as shown in Fig. 12.

99 is a vertically arranged plate secured to the upper side of the bottom wall $l$ and having an inclined surface 99' in the same vertical longitudinal plane of the mechanism, as the extension of the pin 81' on the left hand side of the reciprocatable rod 81, as shown in Fig. 12. The spring 98 tends normally to exert a downward pressure on the rear end of the lever 92, and the cam 96 and the mechanism interposed between it and the said lever 92, are so correlated and arranged as to permit this spring to act only at predetermined intervals to force the guide plate 90 downward, thereby causing the downward travel of the arm 89' so as to depress the rod 81, straighten out the toggle joints 83, 83', and force the fingers 71ª, 71ª together.

The power for actuating the carriage 60 and the mechanism mounted upon the carriage frame L is transmitted to the various parts from a transversely arranged shaft 100 mounted in the bearings at either side of the carriage frame L. This shaft 100 carries a sprocket wheel 101 which is connected by means of a chain 102 with a sprocket wheel 103 rigidly secured to the counter shaft 20. The shaft 100 is also supported at a point adjacent to the sprocket 101 in a bearing carried by a bracket or hanger 104 depending from the folder frame.

105 is a sprocket wheel rigidly secured to the shaft 100. It is connected by a chain 106 with a sprocket wheel 107 on the cam shaft 86 and power is thus transmitted for rotating the cams 86' and 96.

108 is an eccentric rigidly secured to the shaft 100 at a point between the sprocket wheel 105 and the adjacent wall $l^2$ of the carriage frame.

109 is an eccentric or cam plate having an elongated cam slot 109' with the walls of which the eccentric or cam 108 is adapted to engage. At its upper end this cam plate is pivotally connected as indicated at 109$^a$ to the adjacent bracket 59. At its lower end it is pivotally connected at 109$^b$ to the rear end of a link 110.

111 is an arm rigidly secured to the shaft 64 in the same vertical longitudinal plane as the eccentric 108. The link 110 is slotted as indicated at 110' and is connected to the arm 111 by a pin or stud 110$^a$ which extends through the said slot and is adapted to engage the walls thereof. It will be understood that by positioning mechanism, I mean broadly any mechanism which will feed an envelop or a series of envelops, one after the other, into position to receive a folded sheet of paper.

*Mechanism for directing folded sheet to envelop and inserting it.*—The mechanism D for directing the folded sheet or sheets from the last pair of folding rolls to the mechanism E for inserting the sheet or sheets in the opened envelop, comprises a pair of truncated rollers 112, 112', having the same vertical transverse plane of tangency as the last pair of folding rolls. These rollers are carried by inclined shafts 113, 113', which are mounted in suitable bearing standards secured to the upper surface of the plate $k$. The outer end of the shaft 113 is connected by a universal joint 114 to a transversely arranged shaft 115, which extends through the said wall $k'$ and is suitably supported thereby. The sheet-inserting means comprises pairs of coöperating feed rolls 116, 116', and 117, 117'. The rear rolls of each pair are carried by a transversely arranged shaft 118 suitably mounted in bearings in the side walls $l'$, $l^2$ of the carriage frame. The front rolls of each pair are carried by a transversely arranged shaft 119 likewise suitably mounted in the bearings in the side walls $l'$, $l^2$. These inserting rolls are tangent in the same vertical plane containing the line of tangency of the direction-changing rolls 112, 112'.

120 is a slide or directing plate arranged transversely of the carriage frame and at an angle to the horizontal and between and beneath the rolls of the pairs of inserting rolls 116, 116', 117, 117'. This slide or chute is adapted to direct the folded sheet or sheets from the inserting rolls into the envelop immediately beneath it.

121 is a tubular guide depending from a bracket 122 secured to the under side of the plate $k$. This tubular guide is longitudinally slotted as indicated at 121' and has fitted into it the reciprocatable rod 123 carrying a transversely arranged pin 123' which extends laterally from the slot 121' in the tubular guide. At its lower end this reciprocable rod 123 has secured to it a curved plate 124 which is adapted to engage with the upper edge or edges of the folded sheet and to force the sheet downwardly into the open envelop.

125 is an arm or bar pivotally mounted at 125' to a depending plate or bracket carried by the bottom wall $k$ of the folder frame. At its front end this arm or bar is recessed as indicated at 125$^a$ and is adapted to receive between the walls of the recess the pin 123' carried by the reciprocatable rod 123.

126 is a tension spring having its upper end secured to a fixed point on the framework and its lower end attached to the extreme rear end of the arm 125. This spring is adapted normally to act upon the said arm in such manner as to pull upwardly on its rear end and thereby force its front end and the reciprocatable rod 123 downward.

127 is a cam secured to the shaft 100 and having a cam surface adapted to engage with a roller 125$^b$ carried by the arm 125. This cam 127 is so shaped as to permit the descent of the front end of the arm 125 under the action of the spring 126 once during each complete revolution of the cam, the cut-out portion 127' into which the pin or roller 125$^b$ drops, serving for this purpose.

128 is a sprocket wheel secured to the end of the shaft 100 projecting beyond the wall $l'$ of the carriage frame. 129 is a stub shaft carried by the said wall $l'$ and having secured to its outer end a sprocket wheel 130 which is connected by a chain 131 with the sprocket wheel 128.

132 is a sprocket wheel carried by the shaft 129 and rotated by power applied from the sprocket wheel 130. This sprocket wheel 132 is connected by a chain 133 with a sprocket wheel 134 secured to the end of the roll shaft 118. The shafts 118, 119 are connected so as to rotate together by means of gears 135, 136, secured to the shafts 118, 119, respectively.

137, 138, are arms pivotally mounted at 137', 138', respectively, on brackets 139, 140, secured to the adjacent side walls of the carriage frame. At their rear ends these arms are bent first outwardly and then inwardly as indicated at 137$^a$ and 138$^a$ and are adapted to engage with the edges of the envelop and center the envelop so as to properly position it to receive the folded sheet or sheets from the inserting mechanism. These envelop-centering and positioning arms are normally held with their envelop-engaging portions 137ª, 138ª, out of the line of travel of the envelop by means of springs 137ᵇ, 138ᵇ, respectively, arranged in a well known manner at the pivotal connection of the arms. The rear ends 137ᶜ, 138ᶜ, of these arms are normally held by these springs in the path of travel of trippers or lugs 141, 142, respectively, carried at the under surface of the traveling platform 60.

*Mechanism for delivering filled envelops to sealing mechanism.*—The mechanism F for gripping the envelop and directing it from the point at which it is filled to the sealing mechanism, is arranged immediately beneath the inserting mechanism above referred to. It comprises a bracket plate 143 arranged transversely of the carriage and secured to the bottom wall *l* of the carriage frame. It has at either side the rearwardly extending arms 143′, 143ª.

144 is a transversely arranged shaft mounted near either end in bearings carried by the arms 143′, 143ª.

145, 146, are arms or plates loosely mounted upon the shaft 144 adjacent to the arms 143′, 143ª, respectively.

147 is a plate or jaw arranged transversely of the carriage and secured at one end to the arm 145 and at the other end to the arm 146, this plate being rigid with the said arms and adapted to move with them, it forming one jaw of the gripper for gripping the envelop and moving it to the desired depositing point.

148 is a rotatable shaft mounted at either end in bearings carried by the arms 145, 146. This shaft has rigidly secured to it the arms or plates 149, 149′, which carry a transversely arranged plate 150 adapted to coöperate with the plate 147 to form the gripper for the envelop.

151 is a relatively wide gear wheel loosely mounted upon one end of the shaft 144. This gear wheel meshes with a pinion 152 rigidly secured to the shaft 148.

153 is a tension spring fitted on the shaft 144 and having one end fastened to a pin or stop 153′ on the said shaft and its other end bearing against the arm or plate 145.

154 is a washer interposed between the said arm or plate and the adjacent arm 143′ of the bracket 143.

156 is a lever or plate loosely mounted on the shaft 64 and carrying at its rear end a toothed segment 157 which meshes with the gear wheel 151. At its other end this lever or plate is pivotally connected as indicated at 155′ to an eccentric rod or plate 158.

159 is an eccentric secured to the shaft 86 and adapted to actuate said eccentric arm or plate and consequently to cause the oscillation of the lever 156 in such manner as to effect through the segment gear 157 the oscillation of the gear 151.

When the envelop is being advanced by the carriage to the point at which it is to receive the folded sheet or sheets the parts of the envelop-gripping and delivering mechanism F are in the relative positions shown in Fig. 23, the gripping jaw 147 being in vertical position, and the gripping jaw 150 being in horizontal position. The envelop is drawn forward by the carriage to a position in which its lower edge rests upon or is positioned over the jaw 150 in its horizontal position. After the folded sheet or sheets have been inserted into the envelop the eccentric 159 effects the upward travel of the segment 157 and this causes the loose gear 151 to rotate in anti-clockwise direction as viewed in Figs. 23 to 29. This causes the pinion 152 to rotate in clockwise direction and to swing the jaw 150 into vertical position as indicated in Figs. 25 and 26, in which position it coöperates with the jaw 147 to firmly grip the envelop. With the further upward travel of the segment 157, in view of the fact that the rotation of the pinion 152 in its clockwise direction is stopped by the engagement of the gripping jaws 147 and 150, the pinion 152 begins to travel in anti-clockwise direction with the gear 151 as indicated in Fig. 27, and carries with it the arms 145, 146 which are free to swing about the axis of the shaft 144, the spring 153 serving to supply the necessary tension to properly govern this travel of the arms 145 and 146 and to prevent them from swinging too freely on the shaft 144. When the gripping elements have reached the position shown in Fig. 27, the eccentric 159 then operates to cause the downward travel of the segment 157 and the gear 151 rotates in clockwise direction and causes the anti-clockwise rotation of the pinion 152 thereby swinging the jaw 150 downward and rearward as indicated in Figs. 29 and 30 to release and deliver the envelop. With the further downward travel of the segment 157 the further rotation in anti-clockwise direction of the pinion 152 is prevented by the engagement of the arms 149, 149′, with the shaft 144 and the pinion thereupon begins to travel bodily with the gear 151 in clockwise direction about the axis of the shaft 144 and to return the gripping parts to the relative positions shown in Fig. 23.

The envelops are released by the gripping jaws 147 and 150 and dropped upon a guide or slide 160 which is inclined to the horizontal and is adapted to feed the envelops under the action of gravity to the sealing rolls 161, 162. These rolls are arranged horizontally and are carried by transverse shafts mounted at either end in bearings supported by the hangers 163, 163, which depend from the carriage frame structure. As the envelop passes between these rolls the loose flap is pressed down upon the adjacent flap and is sealed thereto by the moist sealing compound carried by the former.

In order to assist in gripping the envelop, removing it from the series or pack in the tray, and carrying it to the point at which it is to receive the folded sheet or sheets, I have provided a pneumatic device which is indicated as an entirety by 164. Of this device, 165 indicates an air pump of any suitable type. I have, for the purpose of illustration, shown it as comprising an oscillating cylinder 166 pivotally mounted on a plate 167 secured to the carriage frame structure.

166' indicates the piston within the cylinder and 166$^a$ indicates the piston-rod which is pivotally connected at its lower end, as indicated at 166$^b$, to the wrist pin on the crank arm 168 which is secured to and rotated by the shaft 86.

169 is a suction or inlet duct communicating with the interior of the cylinder.

170, 171, are pneumatic tubes arranged longitudinally of the carriage at either side thereof and beneath the carriage platform 61. At their rear ends these tubes are provided with suction grippers 172 of any suitable and well known type. The tubes are joined at their front ends by a cross tube 173, and a short tube section 174 leads therefrom to a flexible tube 175 which connects with the duct 169.

During the operation of the machine, as the carriage moves rearward to get an envelop, the pneumatic mechanism is operated so that when the spreading and carrying fingers 71$^a$ enter the envelop the suction piston is moving downward within the cylinder on its suction stroke, and the suction grippers 172 act to engage the front wall of the envelop and to assist in removing the envelop from the envelop tray and to carry it forward to the position at which it is to be filled.

In order to prevent the too rapid travel of the carriage at the end of its rearward stroke and to avoid jarring and retarding of the machine at this time, I have provided a friction-retarding element which consists of a shoe 176 which projects through an opening 176' in the side wall $l^2$ of the carriage frame into the path of travel of the adjacent edge of the platform 61. The inner surface of this shoe is beveled, as indicated, and the shoe is normally held in position within the groove $l^3$ by means of a spring 177 having one end secured to the wall $l^2$ and the other end to the shoe 176.

Power for rotating the shaft 115 which operates the truncated rolls 112, 112', is supplied from the roll shaft 119 by sprocket wheel 178' secured to said shaft and connected by a chain 178 with a sprocket wheel 179 secured to the shaft 114. Power for operating the sealing rolls 161, 162, is furnished from the shaft 118 through the gear 135 thereon, this gear meshing with a gear wheel 181 mounted on a stub shaft 182 extending laterally from the wall $l'$ of the carriage frame which supports it, and through a sprocket wheel 183 carried by said shaft and connected by chain 184 with a sprocket wheel 185 on the shaft, to which the sealing roll 162 is secured. The sealing roll 161 is preferably mounted to permit lateral movement thereof relative to the roll 162 and the two rolls are normally held in forced engagement with each other by means of springs 161'.

In order to assist in properly directing the folded sheet or sheets from the truncated rolls 112, 112' to the inserting mechanism I have provided a guide 186 carried by the wall $l^2$ and having an inclined wall against which the edges of the folded sheets may strike and which will insure that the sheets will enter properly between the pairs of inserting rolls 116, 116', and 117, 117'.

187 is an adjusting screw carried by the rocking plate 72 on the carriage. Its lower end is adapted to engage with the upper surface of the platform 61 and the relation of the rocking plate and the platform may thus be regulated to vary the normal inclination of the finger bars 71, 71 to the platform in accordance with the shape and height of the rear sealed wall of the envelop used.

The operation of the entire mechanism is as follows: Power is applied for rotating the shaft 19 at the desired speed to cause the machine to operate successively upon the number of sheets or circulars per minute or per hour for which the machine is constructed. Let it be assumed that the power transmitting parts for operating the folding mechanism are in the relative positions in which the folding blade 2 is ready to begin its downward stroke in order to force a sheet of paper between the initial pair of folding rolls 4, 4'. Power is then applied from the shaft 19 to the counter shaft 20 through the intervening power transmitting mechanism and the shoulder of the offset 27' engages with the projection 3$^b$ on the arm 3$^a$ and the lever mechanism connected with the said arm causes the folding blade 2 to begin to descend. In the meantime or simultaneously a sheet or circular of paper is fed into proper position beneath the said folding blade and is held therein by the guides 1$^a$. The folding blade 2 then presses the sheet downward at its longitudinal center into engagement with the initial pair of folding rolls 4, 4', and these rolls grasp the sheet and fold it at its middle forcing it in folded condition down into the guides 5, 5. At the same time power is being applied from the said counter shaft 20 to the transverse shaft 100 and from this latter shaft it is transmitted by the interposed mechanism to the oscillating shaft 64 on the carriage frame. This shaft is then turned so as to shift the segmental gears 63 rearwardly and to thereby cause the rearward travel of the carriage 60 toward the front exposed envelop in the envelop tray 49. When the carriage begins its rearward travel the envelop flap-throwing and moistening blade 65' has its uppermost edge below the free flap of the envelop, as shown in Fig. 14, and during the first part of the carriage travel the rear ends of the plates 61ª engage with and force upwardly the oscillating blocks 68 and these blocks in turn engage their respective stub shafts 66 and elevate them so that the pitch circles of the teeth on the gears 67 carried by the said shafts are tangent to the horizontal plane of the pitch lines of the teeth on the racks 69' carried by the arms 69. When the stub shafts 66 are moved upwardly the flap engaging and moistening arm 65' slips upwardly between the rear sealed wall of the envelop and the loose flap thereon, as indicated in Fig. 15. At practically the same time that the gears 67, 67, are elevated, they are engaged by and rotated by the rack sections 69' in such manner as to cause the revolving of the envelop-opening blade 65' so as to throw the free flap of the envelop first forward and then upward and rearward so as to enable the fingers 71ª, 71ª, to slip into the envelop. As the flap of the envelop is swung upwardly and rearwardly, the gummed under surface thereof is engaged by the moistened part 65ᵈ of the said envelop-opening blade, or as hereinbefore stated some mucilaginous substance may be applied by the strip 65ᵉ at this time. When the carriage is thus traveling rearward the envelop-opening fingers 71ª, 71ª, will be in their closely adjacent position and will be elevated so that their points are above the central point of lowest points of the sealed part of the rear wall of the envelop, the swinging block 77 and the cam 76 on the rocking plate 72 serving to cause this elevation. Practically as soon as the envelop-opening fingers reach the said first envelop, the cam rides off of the swinging lug 77 and the springs 75 tend to force the front ends of their respective finger-carrying arms or blades downward so that the fingers 71ª, 71ª, will enter between the front and rear walls of the envelop to open it. As soon as these fingers have entered the envelop at its central portion, the shaft 86 has rotated the cam 86' thereon to the point at which it releases the lever 87 and permits the spring 85ᶜ to act and to force the bar 85ᵇ of the tripper or release mechanism 85 upwardly so that it engages this pin 81' and forces upwardly the reciprocating rod 81 in the guide 80. This will tend to force the bar or head 82 carried by said rod upwardly, throwing it out of alinement with the toggle links 83, 83', so that the spring 78 will at once operate to draw inwardly the front ends of the envelop-opening and positioning arms 71, 71, and consequently to force outwardly and away from each other the fingers 71ª, 71ª on the said arms. When these fingers fly outwardly away from each other they tend to separate the front and rear walls of the envelop and to arrange themselves at either end of the envelop in such manner as to hold the said front and rear walls thereof quite a distance apart. At the same time that the carriage 60 and the envelop-controlling parts thereof move forward to get an envelop and draw it to the place where it is to be filled, the pneumatic suction gripper may be advantageously employed. The suction pump 166 may be operated from the shaft 86 in such manner as to insure that its piston will be on its downward stroke and consequently will act in conjunction with the carriage parts and will create the necessary amount of suction in the suction grippers 172, 172, to insure the proper relative working of these parts with the reciprocating carriage 60 and the envelop-opening and controlling part thereon.

As soon as the opening and positioning fingers 71ª, 71ª, have spread apart from each other within the envelop and as soon as the suction grippers 172, 172, have gripped the foremost wall of the envelop, the carriage starts to move forward and to carry or advance with it the envelop into which the folded sheet or circular is to be inserted. This forward travel of the carriage is occasioned by the rotation in the opposite direction of the segmental gears 63, 63, and the carriage continues to travel forward until it reaches the point at which the envelop-opening fingers 71ª, 71ª, have advanced the envelop to the vertical plane of delivery of the sheet or sheets to be introduced into the said envelop by the inserting mechanism E. During the greater part of the forward travel of the carriage, the flap-opening and moistening blade 65' remains in its elevated rearmost position, and as the envelop is drawn forward its free flap slips from under the said blade, but cannot swing forward and downward into normal position because of the fingers 71ª, 71ª, and while thus held its free end is engaged by the rolls 116', 117', and by the shaft 118 on which they are mounted and is held by these parts out of the vertical plane of insertion of the folded sheet or sheets when the envelop is in the sheet-receiving position. Before the carriage has reached the end of its forward stroke and after the envelop is entirely out of the path of travel of the blade 65', the racks 69', 69', again engage the pinions 67, 67, and swing the said blade forward and downward and then the rear ends of the plates 61ᵃ are withdrawn from engagement with the oscillating plates 68 and the springs 66ᵃ force the said blade into its initial position. In reaching the vertical plane of folded sheet insertion the lower edge of the envelop travels above the then horizontally disposed jaw 150 of the envelop gripping mechanism F. During the carriage's forward travel and just prior to the ceasing thereof, the front ends 137ᶜ, 137ᶜ, of the arms 137, 138, for positioning the envelop transversely within the carriage frame, are engaged by the lugs or projections 141, 142, depending from the carriage platform and the notched rear portions of the said arms are swung inwardly toward each other and toward the vertical edges at the ends of the envelop, the walls of these kinked or notched portions engaging the envelop at either end that is necessary and causing it thus to assume a substantially central position within the carriage frame. Simultaneously with this opening and advancing of the envelop the following mechanism is operating to fold the sheet which has been introduced therein. After this sheet has been dropped into the guides 5, 5, by the initial pair of folding rolls, the lug or projection 28 on the cam wheel 26 engages with the free end of the arm 8ᵃ of the lever 8 and causes the folding blade 7 to travel rearward and to direct the sheet already once folded between the second pair of folding rolls 6, 6′, which will then fold the sheet at one side of its then horizontal transverse center. From this second pair of folding rolls, the sheet, which has now been twice folded, is directed and guided by the supplemental rolls 12, 12′, to and along the guides 14 and 14′ until it is in proper relative position to enter the last pair of folding rolls, 13, 13′. The further rotation of the cam wheel 26 during one complete revolution thereof causes the inside projection or lug 29 to engage the arm 18ᵃ of the lever 18 and to force the folding blade 15 toward the final pair of rolls 13, 13′, in order to direct the now twice folded sheet between them so as to make the third folded section overlap the second one. When the carriage has just about reached the end of its forward stroke, the cam 96 on the shaft 86 releases the end of the arm 94ᵃ on the lever 94 in such manner as to permit the front end of the lever 92 to be swung quickly downward under the action of the spring 98. This causes the downward travel of the arm 89′ and its engagement with the pin 81′ on the reciprocating rod 81. This downward travel of the rod 81 tends to force the head 82 and the toggle links 83, 83′, into longitudinal alinement with each other, thus drawing the fingers 71ᵃ, 71ᵃ, toward each other and into close proximity with each other at the center of the envelop, at the same time one end of the pin 81 engages with the inclined surface 99′ of the standard 99 which tends to rock the lower end of the rod 81 rearward and consequently to rock the rear end of the rocking plate 72 upward against the action of the springs 75, 75, so as to elevate the fingers 71ᵃ, 71ᵃ, above the rear sealed wall of the envelop and to withdraw them from the vertical plane of folded sheet insertion. Also during the travel of the carriage 60 the truncated rolls 112, 112′ for changing the direction of travel of the folded sheet are operated by the mechanism interposed between them and the shaft 119. The folded sheet as it is delivered from the final folding rolls 13, 13′, is directed to the truncated rolls in a vertical position and by these rolls it is engaged and turned so as to lie transversely of the carriage frame and to pass down directly between the pairs of rollers 116, 116′, and 117, 117′. These latter rollers force the folded sheet to travel downward along the guide 120 and directly into the opened envelop which is now positioned beneath the said guide. The plate 124 on the reciprocating rod 121′ now engages the upper edges of the folded sheet or circular and forces it downward into the envelop, the downward travel of the said rod 121′ and the plate 124 which it carries occurring because the recess in the cam 127 on the shaft 100 is at this moment in position to permit the pin 125ᵇ carried by the lever 125 to drop into it and thus allow the downward travel of the reciprocating rod 121′ through the action of the spring 126 on the lever 125.

As soon as the folded sheet or circular has been introduced into the envelop the oscillating segmental gear 157 carried loosely on the shaft 64 and operated by the mechanism interposed between it and the cam shaft 86 is actuated to travel upwardly, causing the gripping face 150 of the envelop gripper to swing upward and forward to grip the envelop at its bottom edge. As soon as the envelop is gripped and during the continued upward travel of the segmental gear 157, the gripping jaws 150 and 147 carrying the envelop, swing rearwardly until the envelop is in position inclined to the horizontal and in substantially the plane of the chute 160. The gear 157 is then caused to reverse its direction of travel and the envelop-gripping jaws at once open and drop the envelop upon the said chute 160, which directs it to the sealing rolls 161, 162, between which it is pressed and by which the gummed edge of the free flap is caused to engage with its coöperating part of the envelop so as to seal the envelop. After the gripping jaws 150 and 147 have released the envelop and during the continued downward travel of the gear 157, they are returned to their initial envelop-gripping position.

All of the parts of the mechanism operate either simultaneously or in proper sequence so as to produce the desired results of folding the sheet, opening the envelop, moistening or gumming the free flap of the envelop, inserting the folded sheet into the envelop and then sealing the envelop.

The envelops in the tray are kept pressed forward at all times by means of the spring-actuated follower 51 and the edges 49$^c$ and 49$^g$ serve to prevent the envelop from being forced out of the tray, but nevertheless interpose such slight resistance as not to materially interfere with the opening of the envelops by the fingers 71$^a$, 71$^a$, and their removal from the tray by the said fingers and the suction grippers 172, 172. I have found that the lip 49$^c$ on the bottom of the envelop tray should be a little to the left of the center of the envelop.

I claim—

1. In a machine of the type described, the combination of mechanism to fold a sheet of paper into flat form, mechanism for positioning an envelop to receive the said sheet after it is folded, and means for directing the said sheet from the said folding mechanism and inserting it into the said envelop.

2. In a machine of the class described, the combination of means for folding a sheet of paper into flat form, means for opening and positioning an envelop to receive said folded sheet, and means for directing the folded sheet from the folding mechanism into the said envelop.

3. In a machine of the type described, the combination of mechanism adapted to make three various folds in a sheet of paper into flat form to accommodate it for insertion into an envelop of a certain size, means for positioning an envelop to receive the said folded sheet, and means for directing the said folded sheet from said folding mechanism into the envelop.

4. In a machine of the type described, the combination of a mechanism adapted to fold up a sheet of paper into flat form for insertion into an envelop of a given size, means for removing an envelop from a pack of envelops and for positioning it to receive the said folded sheet, and means for inserting the folded sheet into the envelop.

5. In a machine of the class described, the combination of a mechanism adapted to fold up a sheet of paper into flat form for insertion into an envelop of a given size, means for removing the envelop from a pack of envelops and for opening and positioning it to receive the said folded sheet as it is delivered from the said folding mechanism, and means for directing said sheet into the said opened envelop.

6. In a machine of the class described, the combination of means for folding a sheet of paper, means for positioning an envelop to receive the said folded sheet, means for moistening the gummed edge of the free flap of the envelop, means for inserting a folded sheet into the envelop, and means for sealing the envelop.

7. In a machine of the class described, the combination of means for folding a sheet of paper into flat form, means for positioning an envelop to receive the said folded sheet, means for inserting the folded sheet into the envelop, and means for sealing the envelop.

8. In a machine of the class described, the combination of means for folding a sheet of paper into flat form for insertion into an envelop of a given size, means for opening an envelop and positioning it to receive the said folded sheet, means for inserting the folded sheet into the open envelop, and means for sealing the envelop.

9. In a machine of the class described, the combination of mechanism for folding a sheet of paper, mechanism for positioning an envelop to receive said sheet of paper and for moistening the gummed edge of the free flap of the envelop, mechanism for inserting the folded sheet into the envelop, sealing mechanism for causing the sealing of the envelop, and mechanism for directing the envelop from the point at which it receives the folded sheet to the said sealing mechanism.

10. In a machine of the class described, the combination of means for folding a sheet of paper into flat form for insertion into an envelop of a given size, means for opening and positioning an envelop to receive the said folded sheet, means for sealing the envelop, means for directing the folded sheet from the folding mechanism into the envelop, and means for directing the envelop from the position at which it receives the folded sheet to the said sealing mechanism.

11. In a machine of the class described, the combination of means for folding a sheet of paper, means for positioning an envelop to receive the said folded sheet of paper, means for moistening or applying a mucilaginous substance to the edge of the free flap of the envelop, means for directing the folded sheet into the envelop, means for sealing the envelop, and means for directing the envelop from the point at which it receives the said folded sheet to the said sealing mechanism.

12. In a machine of the class described, the combination of means for folding a sheet of paper into flat form, means for positioning an envelop to receive said folded sheet, means for directing the said folded sheet from the folding mechanism into the envelop, and power transmitting mechanism connecting said folding mechanism, said envelop-positioning mechanism and said folded-sheet-inserting mechanism arranged to operate said parts in sequence.

13. In a machine of the class described, the combination of means for opening and holding open ready made envelops, one after the other, in position to receive a folded sheet of paper, and means for folding a sheet of paper into flat form and inserting it into the envelop opened to receive it.

14. In a machine of the class described, the combination of means for opening and holding open ready made envelops, one after the other, in position to receive a folded sheet of paper, means for folding a sheet of paper into flat form and inserting it into an envelop opened to receive it, and means for sealing the envelope.

15. In a machine of the class described, the combination of means for opening and holding open ready made envelops, one after the other, in position to receive a folded sheet of paper, means for folding into flat form and inserting a sheet of paper into the envelop opened and positioned to receive it, means for directing a sheet of paper to said folding and inserting mechanism, and means for feeding envelops to said envelop-opening means.

16. In a machine of the class described, the combination of means adapted to fold a sheet of paper into flat form for insertion into an envelop of a given size, means adapted to position an envelop to receive the said folded sheet, means adapted to seal said envelop after the sheet has been inserted therein, means adapted to direct the folded sheet from said folding mechanism into the envelop, and power transmitting means for actuating all of the aforesaid mechanisms in proper sequence.

17. In a machine of the class described, the combination of means for folding a sheet of paper into flat form for insertion into an envelop of a given size, means for positioning an envelop to receive the said folded sheet, means for sealing the envelop, means for directing the folded sheet from said folding mechanism into said envelop, means for directing said envelop from its sheet-receiving position to the said sealing mechanism, and power transmitting means for operating all of the aforedescribed mechanisms in proper sequence.

18. In a machine of the class described, the combination of mechanism adapted to fold a sheet of paper, means adapted to position an envelop to receive said folded sheet, means adapted to moisten the gummed edge of the free flap of the envelop, means adapted to direct the said folded sheet from the folding mechanism into the envelop, means adapted to seal the said envelop, and power transmitting mechanism connected with all of the aforesaid parts and arranged to simultaneously control their operation.

19. In a machine of the class described, the combination of mechanism adapted to fold a sheet of paper, means adapted to position an envelop to receive said folded sheet, means adapted to moisten the gummed edge of the free flap of the envelope, means adapted to direct the said folded sheet from the folding mechanism into the envelop, means adapted to seal the said envelop, and power transmitting mechanism connecting all of the aforesaid parts to a common source of power and adapted to simultaneously control their operation.

20. In a machine of the class described, the combination of means for folding a sheet of paper into flat form, means for positioning an envelop and for opening it and holding it open to receive the said folded sheet, means for directing said folded sheet into said envelop, a power shaft, and power transmitting means interposed between said power shaft and the aforedescribed parts and timed to operate the said parts in proper sequence.

21. In a machine of the class described, the combination of a mechanism for folding a sheet of paper, means for opening, moistening the gummed edge of the free flap of the envelop and positioning the envelop to receive the said folded sheet, means for directing the folded sheet into the envelop, and power transmitting mechanism interposed between the aforesaid parts and a common source of power and adapted to operate the said parts in proper sequence.

22. In a machine of the class described, the combination of a mechanism for folding a sheet of paper, means for opening, moistening the gummed edge of the free flap of the envelop and positioning the envelop to receive the said folded sheet, means for directing the folded sheet into the envelop, a sealing mechanism, means for directing the filled envelop to the sealing mechanism, a source of power, and power transmitting means interposed between said source of power and the aforedescribed parts and adapted to operate them in proper sequence.

23. In a machine of the class described, the combination of a mechanism for folding a sheet of paper into flat form, an envelop-opening and positioning mechanism, mechanism for directing the folded sheet into the envelop, an envelop-sealing mechanism, a source of power, and power transmitting mechanism interposed between said source of power and the aforedescribed mechanisms and arranged to operate them in proper sequence.

24. In a machine of the class described, the combination of means for folding a sheet of paper into flat form for insertion into an envelop, means for feeding ready made envelops, one after the other, into position to receive the sheets of paper as folded by the said folding mechanism, and means for directing a folded sheet of paper into the envelop after said sheet leaves the said folding mechanism.

25. In a machine of the class described, the combination of mechanism for folding a sheet of paper into flat form, automatically actuated means for positioning an envelop to receive the said sheet, and automatically actuated means for directing the said folded sheet from the said folding mechanism into the said envelop.

26. In a machine of the class described, the combination of mechanism for folding a sheet of paper into flat form, automatically actuated means for removing one envelop from a pack of envelops and positioning it to receive the said folded sheet, automatically actuated means for inserting the said folded sheet into the said envelop, and automatically actuated means for sealing the envelop.

27. In a machine of the class described, the combination of a mechanism for folding a sheet of paper, automatically actuated means for removing an envelop from a pack of envelops, opening it, moistening the gummed edge of its free flap and positioning the envelop to receive the said folded sheet, automatically actuated means for directing the folded sheet from the said folding mechanism and inserting it into the said envelop, and automatically actuated means for sealing the said envelop.

28. In a machine of the class described, the combination of a mechanism for folding a sheet of paper, automatically actuated means for removing an envelop from a pack of envelops, opening it, moistening the gummed edge of its free flap and positioning the envelop to receive the said folded sheet, automatically actuated means for directing the folded sheet from the said folding mechanism and inserting it into the said envelop, automatically actuated means for sealing the said envelop, and automatically actuated means for directing the envelop, after it has been filled, to the said sealing mechanism.

29. In a machine of the class described, the combination of a mechanism for folding a sheet of paper, automatically actuated means for removing an envelop from a pack of envelops, opening it, moistening the gummed edge of its free flap and positioning the envelop to receive the said folded sheet, automatically actuated means for directing the folded sheet from the said folding mechanism and inserting it into the said envelop, automatically actuated means for sealing the said envelop, automatically actuated means for directing the envelop, after it has been filled, to the said sealing mechanism, a source of power, and power transmitting devices interposed between said source of power and all of the aforesaid parts, and arranged to operate them in proper sequence.

30. In a machine of the class described, the combination of a mechanism adapted to impart three separate folds to a sheet of paper in order to accommodate it for insertion into an envelop of a given size, means adapted to throw open the free flap of an envelop and to position the envelop to receive the said folded sheet, and means adapted to direct the said folded sheet from said folding mechanism into said envelop.

31. In a machine of the class described, the combination of a mechanism adapted to impart three separate folds to a sheet of paper in order to accommodate it in a folded condition to an envelop of a given size, means adapted to throw open the free flap of an envelop, to moisten its gummed surface, and to position the envelop to receive the said folded sheet, means for directing the said folded sheet from said folding mechanism into the said envelop, and means for actuating the said aforedescribed parts in proper sequence.

32. In a machine of the class described, the combination of mechanism for folding a sheet of paper, a main drive shaft, a counter shaft, power transmitting devices carried by or connected with said counter shaft for actuating said folding mechanism, means for engaging the free flap of an envelop, moistening its gummed edge and throwing it back and for positioning the envelop to receive the said folded sheet, and power transmitting mechanism interposed between said last described means and the said counter shaft.

33. In a machine of the class described, the combination of mechanism for folding a sheet of paper for insertion into an envelop of a given size, the main drive shaft, a counter shaft connected with said main drive shaft, power transmitting devices carried by or connected with said counter shaft for actuating said folding mechanism, means for throwing open the free flap of an envelop and positioning the envelop to receive the said folded sheet, power transmitting mechanism interposed between said last described means and said counter shaft, and means connected with said counter shaft by a power transmitting means for directing said folded sheet from the folding mechanism into the opened envelop.

34. In a machine of the class described, the combination of means for folding a sheet of paper for insertion into an envelop of a given size, a horizontally arranged envelop receptacle, means for advancing the envelops along said receptacle, means for removing the innermost envelop from said receptacle and positioning it to receive the said folded sheet and means for directing the said folded sheet from said folding mechanism into the said envelop.

35. In a machine of the class described, the combination of mechanism for folding a sheet of paper for insertion into an envelop of a given size, a horizontally arranged envelop receptacle, means for feeding the envelops along said receptacle, means for engaging the innermost envelop, throwing back its free flap, opening the envelop and positioning it to receive the said folded sheet, and means for directing the folded sheet from said folding mechanism into the said opened envelop.

36. In a machine of the class described, the combination of means for folding a sheet of paper, a horizontally arranged envelop receptacle, means for feeding the envelops along said receptacle, means for engaging the free flap of the innermost envelop and throwing it backward, reciprocating mechanism having fingers arranged to enter the envelop and then to advance it into a position in which it is to receive the said folded sheet, and means for directing the said folded sheet from the said folding mechanism into the envelop.

37. In a machine of the class described, the combination of means adapted to fold a sheet of paper, an envelop tray, means for feeding the envelops forward along the tray, means for throwing back the free flap of the innermost envelop, a reciprocating carriage carrying fingers adapted to enter the said envelop and to advance it to the point at which it is to receive the folded sheet, and means for directing the said folded sheet from the folding mechanism and inserting it into the said envelop.

38. In a machine of the class described, the combination of means adapted to fold a sheet of paper, means arranged to throw back the free flap of an envelop, a reciprocating carriage carrying fingers adapted to enter the envelop near its center and to then swing to its adjacent ends and while within the envelop to advance it to the position in which it is to receive the said folded sheet, and means for directing the folded sheet into the said envelop.

39. In a machine of the class described, the combination of mechanism adapted to fold a sheet of paper for insertion into an envelop of a given size, means adapted to throw back the free flap of an envelop, a pair of reciprocating and oscillating fingers adapted to enter the envelop, to advance it to a position at which it is to receive the folded sheet and then to withdraw from the envelop, and means for directing the folded sheet from the said folding mechanism and inserting it into the said envelop.

40. In a machine of the class described, the combination of a mechanism adapted to fold a sheet of paper for insertion into an envelop of a given size, an envelop tray, a pair of reciprocating and oscillating fingers arranged to enter the innermost envelop in the said tray at its center and then to spread to the opposite ends thereof and to advance the envelop in open condition to the point at which it is to receive the folded sheet and then to swing back to the center of the envelop and withdraw therefrom, and means for directing a folded sheet from the said folding mechanism into the said opened envelop.

41. In a machine of the class described, the combination of a mechanism adapted to fold a sheet of paper to the desired size, means for throwing back the free flap of an envelop, a reciprocating carriage carrying oscillating arms having at their rear ends depending fingers which are adapted to both enter and leave the envelop from the center thereof, means for spreading said fingers apart within the envelop, in which position they advance the envelop to the point at which it is to receive the folded sheet, and means for directing the folded sheet from said folding mechanism into the envelop.

42. In a machine of the class described, the combination of a mechanism adapted to fold a sheet of paper to the desired size, means for throwing back the free flap of an envelop, a pair of reciprocating and oscillating arms having at their free ends fingers which are adapted to enter the envelop near its center and to then spread apart within the walls of the envelop and to advance it to the position at which it is to receive the said folded sheet, and then to be forced toward each other and removed from the envelop at points near the center thereof, and means for directing the said folded sheet from the said folding mechanism into said envelop.

43. In a machine of the class described, the combination of mechanism adapted to fold a sheet of paper to the desired size, a horizontally arranged envelop tray, means for advancing the envelops along said tray, means adapted to engage the free flap of the innermost envelop and to throw it backward, a pair of reciprocating oscillating arms having at their rear ends depending fingers which are adapted to enter the envelop near its center and to then spread apart within its walls and to advance the envelop to the position at which it is to receive the said folded sheet, and to then swing toward each other and to be removed from the envelop at its center, and means for directing the said folded sheet from the folding mechanism and inserting it into the said envelop.

44. In a machine of the class described, the combination of mechanism adapted to fold a sheet of paper for insertion into an envelop of a given size, an envelop tray, pneumatic mechanism for removing an envelop from said tray and advancing it to the position at which it is to receive the folded sheet, and means for directing the said folded sheet from said folding mechanism into said envelop.

45. In a machine of the class described, the combination of mechanism adapted to fold a sheet of paper to the desired size, an envelop receptacle along which the envelops are fed under pressure, means for engaging and swinging backward the free flap of the innermost envelop, pneumatic mechanism for gripping the said envelop and advancing it to the point at which it is to receive the said folded sheet, and means for directing the said folded sheet from the folding mechanism and inserting it into the said envelop.

46. In a machine of the class described, the combination of mechanism adapted to fold a sheet of paper to the desired size, an envelop receptacle along which the envelops are fed under pressure, means for engaging and swinging backward the free flap of the innermost envelop, means for positively engaging the envelop and advancing it to the point at which it is to receive the folded sheet, supplemental pneumatic mechanism for gripping the envelop and assisting in so advancing it, and means for directing the folded sheet from said folding mechanism and inserting it into the said envelop.

47. In a machine of the class described, the combination of a mechanism adapted to fold a sheet of paper to the desired size, an envelop tray along which the envelops are fed under pressure, mechanism for engaging the free flap of the innermost envelop and throwing it backward and at the same time moistening its gummed edge, means for positively engaging the envelop and advancing it to the point at which it is to receive the folded sheet, and means for directing the said folded sheet from the said folding mechanism and inserting it into the said envelop.

48. In a machine of the class described, the combination of a mechanism adapted to fold a sheet of paper to the desired size, an envelop tray along which the envelops are fed under pressure, mechanism for engaging the free flap of the innermost envelop and throwing it backward and at the same time moistening its gummed edge, means for positively engaging the said envelop and advancing it to the point at which it is to receive the said folded sheet, and there releasing it, and means for directing the said folded sheet from the said folding mechanism and inserting it into said envelop.

49. In a machine of the class described, the combination of mechanism adapted to fold a sheet of paper into flat form for insertion into an envelop of a given size, means for opening an envelop and positioning it to receive the said folded sheet, including mechanism adapted to engage the opposing edges of the opened envelop and hold the envelop central in the path of travel of the folded sheet, and means for directing the said folded sheet from the said folding mechanism into the said opened envelop.

50. In a machine of the character described, the combination of an envelop holder adapted to support a stack of ready made envelops lying flatwise one against another, means associated with said envelop holder for separating the sides of the envelops successively, and means associated with said envelop holder and said separating means for opening the flaps of the envelops successively and causing the position of the same to be reversed.

51. In a machine of the character described, the combination of an envelop holder adapted to support a stack of ready made envelops lying flatwise one against another, means associated with said envelop holder for separating the sides of the envelops successively, means associated with said envelop holder and said separating means for opening the flaps of the envelops successively and causing the position of the same to be reversed and means for holding the flaps of the envelops in an open position.

52. In a machine of the character described, the combination of an envelop holder adapted to support a stack of ready made envelops lying flatwise one against another, means associated with said envelop holder for separating the sides of the envelops successively, means associated with said envelop holder and said separating means for opening the flaps of the envelops successively and causing the position of the same to be reversed and means for inserting articles successively in said envelops.

53. In a machine of the character described, the combination of an envelop holder adapted to support a stack of ready made envelops lying flatwise one against another, means associated with said envelop holder for separating the sides of the envelops successively, means associated with said envelop holder and said separating means for opening the flaps of the envelops successively and causing the position of the same to be reversed, means for inserting articles successively in said envelops, and means associated with said envelop holder for successively sealing the flaps of the envelops after the same have been filled.

54. In a machine of the class described, the combination of automatically actuated means for removing a ready made envelop from a pack of such envelops, opening it, moistening the gummed edge of its free flap and positioning the envelop to receive a sheet, automatically actuated means for directing the sheet and inserting it into the said envelop, and automatically actuated means for sealing the said envelop.

55. In a machine of the class described, the combination of automatically actuated means for removing a ready made envelop from a pack of such envelops, opening it, moistening the gummed edge of its free flap and positioning the envelop to receive a sheet, automatically actuated means for directing the sheet and inserting it into the said envelop, automatically actuated means for sealing the said envelop, and automatically actuated means for directing the envelop, after it has been filled, to the said sealing mechanism.

56. In a machine of the class described, the combination of a sheet folding mechanism, automatically actuated means for removing an envelop from a pack of envelops, opening it, moistening the gummed edge of its free flap and positioning the envelop to receive a sheet, automatically actuated means for directing the sheet from the said folding mechanism and inserting it into the said envelop, automatically actuated means for sealing the said envelop, automatically actuated means for directing the envelop after it has been filled to the said sealing mechanism, a source of power, and power transmitting devices interposed between said source of power and all of the aforesaid parts, and arranged to operate them in proper sequence.

57. In a machine of the class described, the combination of a mechanism for inserting a sheet of paper into a flat ready made envelop, means adapted to throw open the free flap of the envelop, to moisten its gummed surface, and to position the envelop to receive the said sheet, means for directing the said sheet to said inserting mechanism, and means for actuating the said aforedescribed parts in proper sequence.

58. In a machine of the class described, the combination of mechanism for supplying a sheet of paper, a main drive shaft, a counter shaft, power transmitting devices carried by or connected with said counter shaft for actuating said supplying mechanism, means for engaging the free flap of a ready made envelop, moistening its gummed edge and throwing it back, and positioning the envelop to receive the said sheet, means for inserting the sheet in the envelop, and power transmitting mechanism interposed between said last described means and the said counter shaft.

59. In a machine of the class described, the combination of mechanism for supplying a sheet of paper for insertion into a ready made envelop of a given size, the main drive shaft, a counter shaft connected with said main drive shaft power transmitting devices carried by or connected with said counter shaft for actuating said sheet supplying mechanism, means for throwing open the free flap of the envelop and positioning the envelop to receive the said sheet, power transmitting mechanism interposed between said last described means and said counter shaft, and means connected with said counter shaft by a power transmitting means for directing said sheet from the supplying mechanism into the opened envelop.

60. In a machine of the class described, the combination of means for supplying a sheet of paper for insertion into an envelop of a given size, a horizontally arranged envelop receptacle, means for advancing the envelops along said receptacle, means for removing the innermost envelop from said receptacle and positioning it to receive the said sheet, and means for directing the said sheet from said supplying mechanism into the said envelop.

61. In a machine of the class described, the combination of mechanism for supplying a sheet of paper for insertion into an envelop of a given size, a horizontally arranged envelop receptacle, means for feeding the envelops along said receptacle, means for engaging the innermost envelop, throwing back its free flap, opening the envelop and positioning it to receive the said sheet, and means for directing the sheet from said supplying mechanisms into the said opened envelop.

62. In a machine of the class described, the combination of means for supplying a sheet of paper, a horizontally arranged envelop receptacle, means for feeding the envelops along said receptacle, means for engaging the free flap of the innermost envelop and throwing it backward, reciprocating mechanism having fingers arranged to enter the envelop and then to advance it into a position in which it is to receive the said sheet, and means for directing the said sheet from the said supplying mechanism into the envelop.

63. In a machine of the class described, the combination of means adapted to supply a sheet of paper, an envelop tray, means for feeding the envelops forward along the tray, means for throwing back the free flap of the innermost envelop, a reciprocating carriage carrying fingers adapted to enter the said envelop and to advance it to the point at which it is to receive the sheet, and means for directing the said sheet from the supplying mechanism and inserting it into the said envelop.

64. In a machine of the class described, the combination of means adapted to supply a sheet of paper, means arranged to throw back the free flap of an envelop, a reciprocating carriage carrying fingers adapted to enter the envelop near its center and to then swing to its adjacent ends and while within the envelop to advance it to the position in which it is to receive the said sheet, and means for directing the sheet into the said envelop.

65. In a machine of the class described, the combination of mechanism adapted to supply a sheet of paper for insertion into an envelop of a given size, means adapted to throw back the free flap of an envelop, a pair of reciprocating and oscillating fingers adapted to enter the envelop, to advance it to a position at which it is to receive the sheet and then to withdraw from the envelop, and means for directing the sheet from the said supplying mechanism and inserting it into the said envelop.

66. In a machine of the class described, the combination of a mechanism adapted to supply a sheet of paper for insertion into an envelop of a given size, an envelop tray, a pair of reciprocating and oscillating fingers arranged to enter the innermost envelop in the said tray at its center and then to spread to the opposite ends thereof and to advance the envelop in open condition to the point at which it is to receive the sheet and then to swing back to the center of the envelop and withdraw therefrom, and means for directing the sheet from the said supplying mechanism into the said opened envelop.

67. In a machine of the class described, the combination of a mechanism adapted to supply a sheet of paper of the desired size, means for throwing back the free flap of an envelop, a reciprocating carriage carrying oscillating arms having at their rear ends depending fingers which are adapted to both enter and leave the envelop from the center thereof, means for spreading said fingers apart within the envelop, in which position they advance the envelop to the point at which it is to receive the sheet, and means for directing the sheet from said supplying mechanism into the envelop.

68. In a machine of the class described, the combination of a mechanism adapted to supply a sheet of paper of the desired size, means for throwing back the free flap of an envelop, a pair of reciprocating and oscillating arms having at their free ends fingers which are adapted to enter the envelop near its center and to then spread apart within the walls of the envelop and to advance it to the position at which it is to receive the said sheet, and then to be forced toward each other and removed from the envelop at points near the center thereof, and means for directing the said sheet from the said supplying mechanism into said envelop.

69. In a machine of the class described, the combination of mechanism adapted to supply a sheet of paper to the desired size, a horizontally arranged envelop tray, means for advancing the envelops along said tray, means adapted to engage the free flap of the innermost envelop and to throw it backward, a pair of reciprocating oscillating arms having at their rear ends depending fingers which are adapted to enter the envelop near its center and to then spread apart within its walls and to advance the envelop to the position at which it is to receive the said sheet, and to then swing toward each other and to be moved from the envelop at its center, and means for directing the said sheet from the supplying mechanism and inserting it into the said envelop.

70. In a machine of the class described, the combination of mechanism adapted to supply a sheet of paper for insertion into an envelop of a given size, an envelop tray, pneumatic mechanism for removing an envelop from said tray and advancing it to the position at which it is to receive the sheet, and means for directing the said sheet from said supplying mechanism into said envelop.

71. In a machine of the class described, the combination of mechanism adapted to supply a sheet of paper, of the desired size, an envelop receptacle along which the envelops are fed under pressure, means of engaging and swinging backward the free flap of the innermost envelop, pneumatic mechanism for gripping said envelop and advancing it to the point at which it is to receive the said sheet, and means for directing the said sheet from the supplying mechanism and inserting it into the said envelop.

72. In a machine of the class described, the combination of mechanism adapted to supply a sheet of paper of the desired size, an envelop receptacle along which the envelops are fed under pressure, means for engaging and swinging backward the free flap of the innermost envelop, means for positively engaging the envelop and advancing it to the point at which it is to receive the sheet, supplemental pneumatic mechanism for gripping the envelop and assisting in so advancing it, and means for directing the sheet from said supplying mechanism and inserting it into the said envelop.

73. In a machine of the class described, the combination of a mechanism adapted to supply a sheet of paper of the desired size, an envelop tray along which the envelops are fed under pressure, mechanism for engaging the free flap of the innermost envelop and throwing it backward and at the same time moistening its gummed edge, means for positively engaging the envelop and advancing it to the point at which it is to receive the sheet, and means for directing the said sheet from the said supplying mechanism and inserting it into the said envelop.

74. In a machine of the class described, the combination of a mechanism adapted to supply a sheet of paper of the desired size, an envelop tray along which the envelops are fed under pressure, mechanism for engaging the free flap of the innermost envelop and throwing it backward and at the same time moistening its gummed edge, means for positively engaging the said envelop and advancing it to the point at which it is to receive the said sheet, and there releasing it, and means for directing the said sheet from the said supplying mechanism and inserting it into said envelop.

75. In a machine of the class described, the combination of mechanism adapted to supply a sheet of paper into flat form for insertion into an envelop of a given size, means for opening an envelop and positioning it to receive the said sheet, including mechanism adapted to engage the opposing edges of the opened envelop and hold the envelop central in the path of travel of the sheet, and means for directing the said sheet from the said supplying mechanism into the said opened envelop.

In testimony whereof I affix my signature, in presence of two witnesses.

JOHN W. POLER.

Witnesses:
J. S. BARKER,
E. R. ALEXANDER.